United States Patent
Liassides et al.

(10) Patent No.: US 11,146,861 B2
(45) Date of Patent: *Oct. 12, 2021

(54) DYNAMIC VIDEO ADVERTISEMENT REPLACEMENT

(71) Applicant: Roku, Inc., San Jose, CA (US)

(72) Inventors: Marcus Liassides, Cardiff (GB); Stefan Liassides, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,677

(22) Filed: Jun. 22, 2020

(65) Prior Publication Data
US 2020/0322695 A1   Oct. 8, 2020

Related U.S. Application Data

(60) Division of application No. 16/144,361, filed on Sep. 27, 2018, now Pat. No. 10,728,627, which is a
(Continued)

(51) Int. Cl.
*H04N 21/81* (2011.01)
*H04N 21/442* (2011.01)
(Continued)

(52) U.S. Cl.
CPC .......... *H04N 21/812* (2013.01); *G06Q 30/02* (2013.01); *G06Q 30/0241* (2013.01);
(Continued)

(58) Field of Classification Search
CPC .......... G06Q 30/0251; G06Q 30/0277; G06Q 30/0241; G06Q 30/0244; G06Q 30/0283;
(Continued)

(56) References Cited

U.S. PATENT DOCUMENTS 6,698,020 B1   2/2004   Zigmond et al.
6,985,882 B1   1/2006   Del Sesto
(Continued)

FOREIGN PATENT DOCUMENTS

KR   10-2009-0128251   12/2009

OTHER PUBLICATIONS

International Search Report and Written Opinion dated Oct. 31, 2016, on Application No. PCT/US16/47203.

*Primary Examiner* — Jason Salce
(74) *Attorney, Agent, or Firm* — McDonnell Boehnen Hulbert & Berghoff LLP

(57) ABSTRACT

A system and method includes an automatic content recognition (ACR) headend to perform ACR recognition on a video stream that is also being streamed to a smart TV, to detect timing of an upcoming ad spot to be delivered within the video stream. An addressable TV (ATV) engine can be in communication with the ACR head end and to: determine, from data of an ad campaign, whether a first ad to be delivered to the ad spot is off target for the ad spot; notify the ad replacer client to replace the first ad with an addressable ad when the first ad is off target for the ad spot; and provide, to the ad replacer client, criteria with which to constrain an ad request to obtain a second ad that is on target for the ad spot.

12 Claims, 11 Drawing Sheets

Related U.S. Application Data continuation of application No. 15/650,425, filed on Jul. 14, 2017, now Pat. No. 10,110,969, which is a division of application No. 15/058,750, filed on Mar. 2, 2016, now Pat. No. 9,743,154.

(60) Provisional application No. 62/216,216, filed on Sep. 9, 2015.

(51) Int. Cl.
| | |
|---|---|
| *H04N 21/44* | (2011.01) |
| *H04N 21/258* | (2011.01) |
| *G06Q 30/02* | (2012.01) |
| *H04N 21/25* | (2011.01) |
| *H04N 21/2547* | (2011.01) |
| *H04N 21/262* | (2011.01) |
| *H04N 21/45* | (2011.01) |
| *H04N 21/458* | (2011.01) |
| *H04N 21/466* | (2011.01) |

(52) U.S. Cl.
CPC ..... *G06Q 30/0276* (2013.01); *G06Q 30/0277* (2013.01); *H04N 21/252* (2013.01); *H04N 21/2547* (2013.01); *H04N 21/25841* (2013.01); *H04N 21/25883* (2013.01); *H04N 21/262* (2013.01); *H04N 21/44016* (2013.01); *H04N 21/44204* (2013.01); *H04N 21/44209* (2013.01); *H04N 21/458* (2013.01); *H04N 21/4532* (2013.01); *H04N 21/4667* (2013.01)

(58) Field of Classification Search
CPC ............. H04N 21/4622; H04N 21/454; H04N 21/812; H04N 21/4316
See application file for complete search history.

(56) References Cited

U.S. PATENT DOCUMENTS

| | | |
|---|---|---|
| 7,690,013 B1 | 3/2010 | Eldering et al. |
| 7,827,128 B1 | 11/2010 | Karlsson et al. |
| 8,065,703 B2 | 11/2011 | Wilson et al. |
| 8,417,650 B2 | 4/2013 | Graepel et al. |
| 8,478,643 B1 | 7/2013 | Konigstein Ross |
| 8,510,773 B1 | 8/2013 | Abou-Rizk et al. |
| 8,874,468 B2 | 10/2014 | Gargi |
| 9,426,519 B1 | 8/2016 | Lewis et al. |
| 9,510,025 B1 | 11/2016 | Einarsson et al. |
| 9,706,261 B2 | 7/2017 | Chen |
| 9,736,503 B1 | 8/2017 | Bakshi et al. |
| 9,772,752 B1 | 9/2017 | Jaini |
| 9,986,275 B2 | 5/2018 | Smith et al. |
| 10,194,214 B2 * | 1/2019 | Byers ................ G06Q 30/0271 |
| 10,296,936 B1 | 5/2019 | Saurabh et al. |
| 10,607,169 B1 * | 3/2020 | Carlisle ............. G06Q 30/0246 |
| 2002/0087973 A1 | 7/2002 | Hamilton et al. |
| 2002/0144262 A1 | 10/2002 | Plotnick et al. |
| 2002/0184047 A1 | 12/2002 | Plotnick et al. |
| 2003/0023973 A1 | 1/2003 | Monson et al. |
| 2003/0149975 A1 | 8/2003 | Eldering et al. |
| 2004/0133909 A1 | 7/2004 | Ma et al. |
| 2004/0189873 A1 | 9/2004 | Konig et al. |
| 2005/0149964 A1 | 7/2005 | Thomas et al. |
| 2005/0154717 A1 | 7/2005 | Watson et al. |
| 2005/0203849 A1 | 9/2005 | Benson |
| 2005/0251399 A1 | 11/2005 | Agarwal et al. |
| 2005/0289587 A1 | 12/2005 | Chiu |
| 2007/0061195 A1 | 3/2007 | Liu et al. |
| 2007/0214476 A1 | 9/2007 | Zalewski et al. |
| 2007/0271136 A1 | 11/2007 | Strauss et al. |
| 2007/0288953 A1 | 12/2007 | Sheeman et al. |
| 2008/0004962 A1 | 1/2008 | Muthukrishnan et al. |
| 2008/0066107 A1 | 3/2008 | Moonka et al. |
| 2008/0092159 A1 | 4/2008 | Dmitriev et al. |
| 2008/0140524 A1 | 6/2008 | Anand et al. |
| 2008/0187279 A1 | 8/2008 | Gilley et al. |
| 2008/0249834 A1 | 10/2008 | Zigmond et al. |
| 2008/0300957 A1 | 12/2008 | Hirai et al. |
| 2009/0006191 A1 | 1/2009 | Arankalle et al. |
| 2009/0132346 A1 | 5/2009 | Duggal et al. |
| 2009/0265733 A1 | 10/2009 | McKelvey |
| 2009/0299799 A1 | 12/2009 | Racho et al. |
| 2009/0300031 A1 | 12/2009 | Lejano et al. |
| 2010/0153210 A1 | 6/2010 | Oh et al. |
| 2010/0269128 A1 | 10/2010 | Gordon |
| 2011/0016479 A1 | 1/2011 | Tidwell et al. |
| 2011/0029373 A1 | 2/2011 | Steelberg et al. |
| 2011/0078014 A1 | 3/2011 | Feldman et al. |
| 2011/0119125 A1 | 5/2011 | Javangula et al. |
| 2011/0196733 A1 | 8/2011 | Li et al. |
| 2011/0231264 A1 | 9/2011 | Dilling et al. |
| 2011/0238493 A1 | 9/2011 | Ghosh et al. |
| 2011/0238494 A1 * | 9/2011 | Park ...................... G06Q 30/02 705/14.46 |
| 2011/0246661 A1 | 10/2011 | Manzari et al. |
| 2011/0264516 A1 | 10/2011 | Lang et al. |
| 2012/0005029 A1 | 1/2012 | Lang et al. |
| 2012/0036023 A1 | 2/2012 | Das et al. |
| 2012/0144291 A1 * | 6/2012 | Chang .................... H04L 67/02 715/234 |
| 2012/0167133 A1 | 6/2012 | Carroll et al. |
| 2012/0180084 A1 | 7/2012 | Huang et al. |
| 2012/0192214 A1 | 7/2012 | Hunn et al. |
| 2012/0226538 A1 | 9/2012 | Tawakol et al. |
| 2012/0230652 A1 | 9/2012 | Mirsky et al. |
| 2012/0310728 A1 | 12/2012 | Kagan |
| 2013/0007799 A1 * | 1/2013 | Sandoval ......... H04N 21/25883 725/32 |
| 2013/0030908 A1 | 1/2013 | Gessner et al. |
| 2013/0031582 A1 | 1/2013 | Tinsman et al. |
| 2013/0085865 A1 | 4/2013 | Zhou et al. |
| 2013/0091521 A1 | 4/2013 | Phillips et al. |
| 2013/0110594 A1 | 5/2013 | Sinyagin et al. |
| 2013/0117102 A1 | 5/2013 | Barbieri et al. |
| 2013/0144970 A1 * | 6/2013 | Abdulhayoglu ........ H04L 67/32 709/217 |
| 2013/0205315 A1 | 8/2013 | Sinha et al. |
| 2013/0205321 A1 | 8/2013 | Sinha et al. |
| 2013/0318157 A1 | 11/2013 | Harrison |
| 2014/0046777 A1 | 2/2014 | Markey et al. |
| 2014/0053173 A1 * | 2/2014 | Oh .................... H04N 21/44218 725/12 |
| 2014/0109123 A1 | 4/2014 | Balakrishnan et al. |
| 2014/0129325 A1 | 5/2014 | Zinger et al. |
| 2014/0164921 A1 | 6/2014 | Salinas |
| 2014/0196081 A1 | 7/2014 | Emans et al. |
| 2014/0267911 A1 | 9/2014 | Grant et al. |
| 2014/0282692 A1 | 9/2014 | Bhat |
| 2014/0304069 A1 | 10/2014 | Lacey et al. |
| 2014/0358667 A1 | 12/2014 | Beltramo, Jr. |
| 2015/0181267 A1 | 6/2015 | Morales et al. |
| 2015/0181268 A1 | 6/2015 | Navin et al. |
| 2015/0289000 A1 | 10/2015 | Donohue et al. |
| 2015/0332317 A1 | 11/2015 | Cui et al. |
| 2015/0348134 A1 | 12/2015 | Jiang et al. |
| 2016/0050129 A1 | 2/2016 | Hoyne |
| 2016/0134934 A1 | 5/2016 | Jared et al. |
| 2016/0150289 A1 | 5/2016 | Lee et al. |
| 2016/0162955 A1 | 6/2016 | O'Kelley et al. |
| 2016/0316261 A1 | 10/2016 | Koshevoy |
| 2016/0316262 A1 | 10/2016 | Chen |
| 2016/0366465 A1 | 12/2016 | Kerns et al. |
| 2016/0379300 A1 * | 12/2016 | Hirai ..................... G06Q 30/08 705/26.3 |
| 2016/0381433 A1 * | 12/2016 | Dhungana .......... G06Q 30/0241 725/32 |

* cited by examiner

DYNAMIC VIDEO ADVERTISEMENT REPLACEMENT

CROSS REFERENCE TO RELATED APPLICATIONS

This U.S. patent application is a divisional of, and claims priority under 35 U.S.C. § 120 from, U.S. patent application Ser. No. 16/144,361, filed on Sep. 27, 2018, which is a continuation of, and claims priority under 35 U.S.C. § 120 from, U.S. patent application Ser. No. 15/650,425, filed on Jul. 14, 2017, which is a divisional of, and claims priority under 35 U.S.C. § 121 from, U.S. patent application Ser. No. 15/058,750, filed on Mar. 2, 2016, which claims priority under 35 U.S.C. § 119(e) to U.S. Provisional Application 62/216,216, filed Sep. 9, 2015. The disclosures of these prior applications are considered part of the disclosure of this application and are hereby incorporated by reference in their entireties.

TECHNICAL FIELD

This disclosure relates to dynamic video advertisement replacement.

BACKGROUND

Media consumption devices, such as smart televisions (TVs), can access broadcast digital content and receive data, such as streaming media, from data networks (such as the Internet). Streaming media refers to a service in which media content such as movies or news can be provided to an end user over a telephone line, cable, Internet, and so forth upon request. For example, a user can view a movie without having to leave a residence of the user. Also, users can access various types of educational content, such as video lectures, without having to physically attend at a school or educational institution.

As the number of media consumption devices continues to increase, video content generation and delivery can similarly increase. With an increase in use of media consuming devices (such as smartphones, tablets, and smart televisions) to access streaming media, content or network providers (such as local broadcasters, multi-channel networks, and other content owners/distributors) can distribute contextually-relevant material to viewers that are consuming streaming media (e.g., media programs). For example, local broadcasters can include contextually-relevant advertisements and interactive content with streaming media.

SUMMARY

One aspect of the disclosure provides a smart television that includes a non-transitory computer-readable medium storing a first set of instructions and a second set of instructions and a processing device to execute the first set of instructions to implement an automatic content recognition (ACR) client and to execute the second set of instructions to implement an advertisement (ad) replacer client. The ACR client is configured to: send frames of a video stream to be matched to a headend ACR of an addressable television (ATV) system; forward, to the ad replacer client, an ACR event received from the headend ACR that identifies a channel on which the video stream is playing; and notify the ad replacer client upon detecting an ad spot in the video stream. The ad replacer client is configured to receive a notification from the ATV system. The notification indicates that a first ad destined for the ad spot is off target for the ad spot, and includes criteria for determining a second ad that is on target for the ad spot. The ad replacer client is further configured to generate an ad request including one or more parameters from the criteria and transmit the ad request to a supply side platform (SSP) computing system at which advertisers will bid on filling the ad spot with the second ad.

Implementations of the disclosure may include one or more of the following optional features. In some implementations, the ACR client is further configured to monitor the channel on which the video stream is playing and notify the ad replacer client in response to detecting a channel change. The ad replacer client may be further configured to cancel the ad request in response to being notified of the channel change. The criteria may include audience parameters comprising one or more of a demographic parameter, a geographic parameter, and a language setting. Moreover, in some implementations, the ad replacer client is further configured to download and install an application through which to retrieve television parameters comprising one or more of a network identifier (ID), a channel ID, a video ID of the video stream, and current time.

In some examples, the ACR client is further configured to receive a content identifier (ID) for the video stream from the ACR headend and send the content ID to the ad replacer client, wherein the content ID identifies an ad campaign with which is affiliated the ad spot. In some examples, the ad replacer client is further configured to: notify the ATV system that the video stream is being viewed on the channel; notify the ATV system of the content ID corresponding to the video stream; and request the notification from an ATV engine of the ATV system. The non-transitory computer-readable medium may store the second ad that is delivered to the ad spot.

The non-transitory computer-readable medium may store a third set of instructions, which, when executed by the processing device, cause the processing device to launch a web browser, the web browser configured to display the second ad. The instructions may include firmware executable to access frames of the video stream. In some examples, the ad replacer client is further configured to: begin downloading the second ad; determine, in view of download speed and file size, when the second ad being downloaded can be played through without buffering; and signal the processing device to begin playing the second ad in the ad spot.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
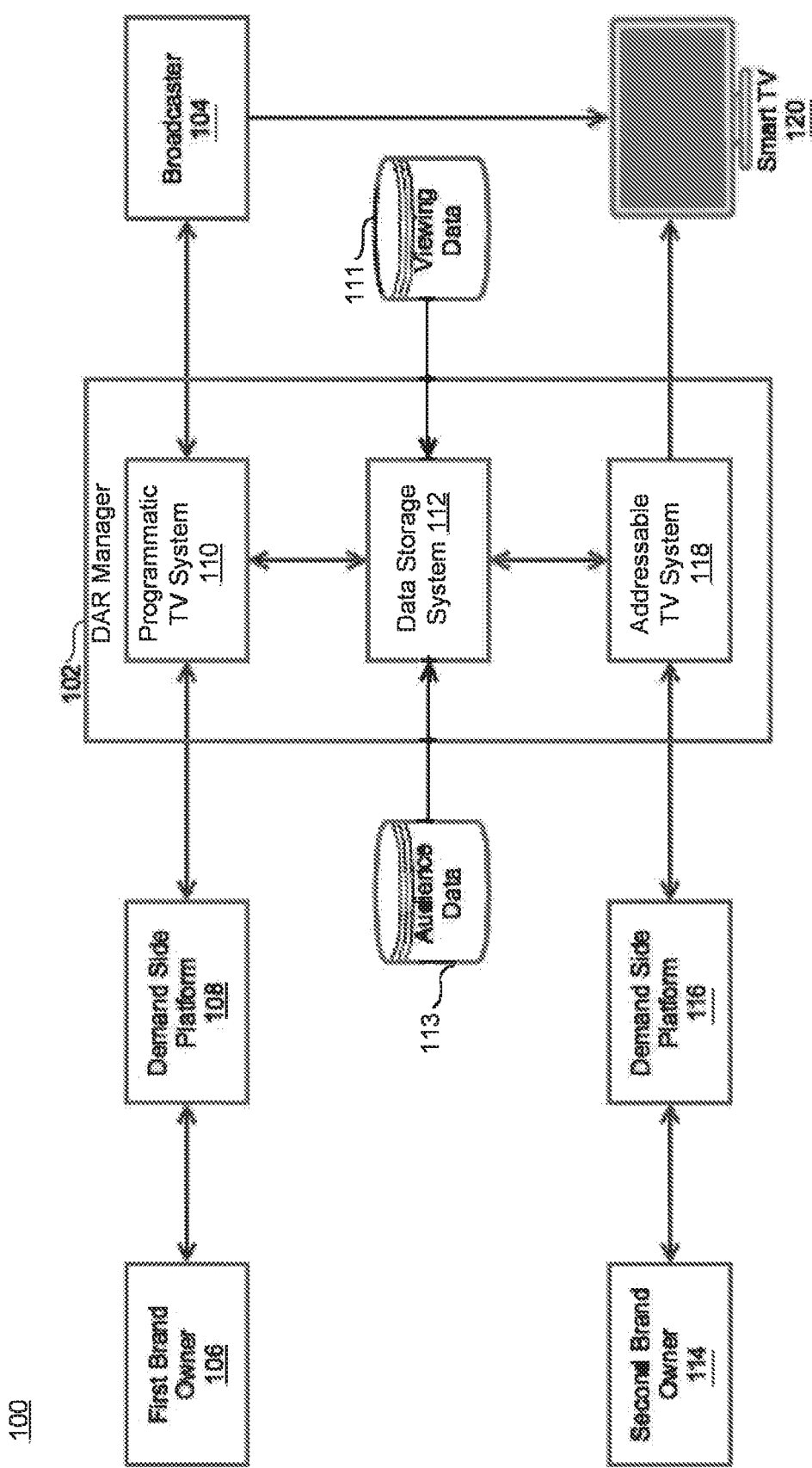
FIG. 1 illustrates a system for the creation, sale, purchase, fulfilment and reconciliation of dynamic advertisement (ad) replacement inventory according to one embodiment of the present disclosure.

Digital advertising (predominantly web and mobile) is typically made available by publishers via supply side platforms (SSPs) or ad networks. These publishes provide digital ad inventory stored on computers such as servers (e.g., web servers and other publishing platforms) that include computer storage for storing digital documents, to include web pages and computer or device applications and the like. This digital ad inventory (or available ad spots or slots) is sometimes reserved or contracted for directly and based on a number of impressions (or views) advertisers seeks for their ad campaigns. More recently, however, it has become common practice for SSPs and ad networks to make this inventory available through server storage of digital ad exchanges. Advertisers, such as via an ad agency, can then connect through a demand side platform (DSP) to set up advertising campaigns that use one or more ad exchanges to find available inventory to be filled with the advertiser's ad.

The ad exchanges may perform the buying and selling of digital ad inventory in real-time. For example, when a consumer uses a laptop to display a web page that contains space for an ad or a video pre-roll ad, the code on the web page contacts the ad exchange, which then starts an auction for that ad space by evaluating the campaigns that have been set up to determine the highest bidder, which can be based on the target audience for the campaign. When the auction has been won, the winning ad is then served (or delivered) to the web page containing the ad space. It is also possible for computing systems of DSPs and SSPs to communicate directly and to negotiate the selling and buying of digital ad inventory without the assistance of an ad exchange, which usually has a target number of impressions as part of any resultant agreement.

Broadcasters can be any operator responsible for the distribution of media and spots within a video stream to TVs and other client devices capable of streaming video. A broadcast can be considered the video stream through which media is distributed, including ad spots, which are more commonly referred to as ad availability spot or "avail," e.g., a time period for insertion of a media segment. When an avail is already filled with a media segment, it will be referred to as an ad spot herein. Spot sellers can be any number of organizations that have the responsibility of selling TV spot inventory (e.g., broadcasters, platform operators, cable networks, or media representative firms). A smart TV, for ease of explanation, can be any device capable of receiving broadcast TV that is connected to the Internet and capable of determining the content being viewed.

Broadcast TV advertising has traditionally been bought and sold through a mostly manual process, with deals being done between advertisers and broadcasters via third party agencies. More recently, the use of DSPs and programmatic TV (PTV) platforms or systems have become available, where advertisers or agencies can buy broadcast TV ad inventory programmatically, often with the involvement of other third party companies and platforms that manage and expose the inventory available from broadcasters and allow that inventory to be purchased.

To date, these two worlds have largely existed completely separate. However, with the desire for the broadcast TV advertising industry to become more targeted, there is a growing demand for dynamic ad replacement (DAR), where in the case described herein, the end user device (such as a smart TV, for example) can replace a broadcast TV ad with a more suitable ad targeted at the user by streaming that replacement ad over the Internet, thereby improving the performance of the advertiser's campaign and providing a better experience for the user by showing products in which the user is more likely to be interested.

Disclosed is a system and methods of bringing together digital advertising and broadcast TV advertising to create, and offer for sale, TV DAR inventory that can be targeted in real time, and to allow this TV DAR inventory to be purchased programmatically through the disclosed computer systems. Furthermore, the disclosed system and methods automate the reconciliation of payments for bought and sold broadcast TV ad inventory with TV DAR inventory.

In one embodiment, for example, a system can include an automatic content recognition (ACR) headend to store a first fingerprint of an advertisement (ad) spot and to monitor a video stream ahead in time from when the video stream is delivered to a smart TV. The ACR headend can further detect the ad spot by comparing the first fingerprint with a second fingerprint that is captured of the ad spot during monitoring the video stream. The ACR headend can also monitor a channel being watched on the smart TV, and notify an ad replacer client of the smart TV upon detecting that the ad spot is to arrive within the video stream on the channel. The system can further include an addressable TV (ATV) engine in operative communication with (or operatively coupled to) the ACR headend, where the ATV engine is to determine, from data of an ad campaign, whether a first ad to be delivered to the ad spot is off target for the ad spot. The ATV engine can then notify the ad replacer client to replace the first ad with an addressable ad when the first ad is off target for the ad spot, and provide, to the ad replacer client, criteria with which to constrain an ad request to obtain a second ad that is on target for the ad spot.

In a corresponding embodiment, the smart TV can then use these criteria to generate the ad request, which is sent to an SSP computing system or ad exchange, to be fulfilled. For example, the smart TV can include a non-transitory computer-readable medium storing a first set instructions and a second set of instructions. A processing device of the smart TV can execute the first set of instructions to implement an automatic content recognition (ACR) client and execute the second set of instructions to implement an advertisement (ad) replacer client. The ACR client can send frames of a video stream to be matched to a headend ACR of an addressable television (ATV) system and forward, to the ad replacer client, an ACR event received from the headend ACR that identifies a channel on which the video stream is playing. The ACR client can also notify the ad replacer client upon detecting an ad spot in the video stream. The ad replacer client can receive a notification from the ATV system that indicates that a first ad destined for the ad spot is off target for the ad spot, and includes criteria for determining a second ad that is on target for the ad spot. The ad replacer can then generate an ad request including one or more parameters from the criteria and transmit the ad request to a supply side platform at which advertisers will bid on filling the ad slot with the second ad.

The diagram in FIG. 1 illustrates an automated system 100 for the creation, sale, purchase, fulfilment and reconciliation of dynamic ad replacement inventory. The system 100 includes a dynamic ad replacement (DAR) manager 102 that coordinates the sale, purchase, fulfilment and reconciliation aspects through interacting computing systems. The DAR manager 102 includes a programmatic TV (PTV) system 110, a data storage system 112 and an addressable TV (ATV) system 118. The system 100 can further include a broadcaster 104, a first brand owner 106, a demand side platform (DSP) computing system 108, an audience database 113, a viewing database 111, a second brand owner 114, another DSP computing system 116, and a smart TV 120 to which the broadcaster and the DAR manager deliver ads to fill ad inventory.

In particular, the broadcaster 104 (e.g., spot seller) owns broadcast TV avails (e.g., inventory) that the broadcaster wants to sell and fill with ads. The first brand owner 106 wants to purchase broadcast TV avails as part of an advertising campaign, and can do so through the DSP computing system 108, which can perform the negotiating and contract formation between the PTV system 110 and brand owners. The broadcaster 104 can further use the PTV system 110 to make broadcast TV avails available for purchase. The DSP computing system 108 can use the PTV system 110 to purchase the broadcast TV inventory on behalf of the first brand owner 106.

The PTV system 110 can use the data storage system 112 to make available some of the broadcast TV ad inventory for dynamic ad replacement by combining audience data and viewing data to make appropriate ad targeting decisions for the ATV system 118.

The second brand owner 114 wants to purchase DAR inventory and can do so through another DSP computing system 116, which can perform the negotiation and contract formation on behalf of the second brand owner. The ATV system 118 can identify and present for sale dynamic ad replacement inventory that, based on information obtained from the data storage system 112, targets ad spots on a particular smart TV being viewed by a particular consumer. The consumer watches video streamed to the smart TV 120 that can include broadcast TV ads delivered by the broadcaster 104 as part of the regular broadcast signal in some cases and dynamically replaced ads delivered by the addressable TV system 118 streamed over the Internet in other cases.

Figure 2A:
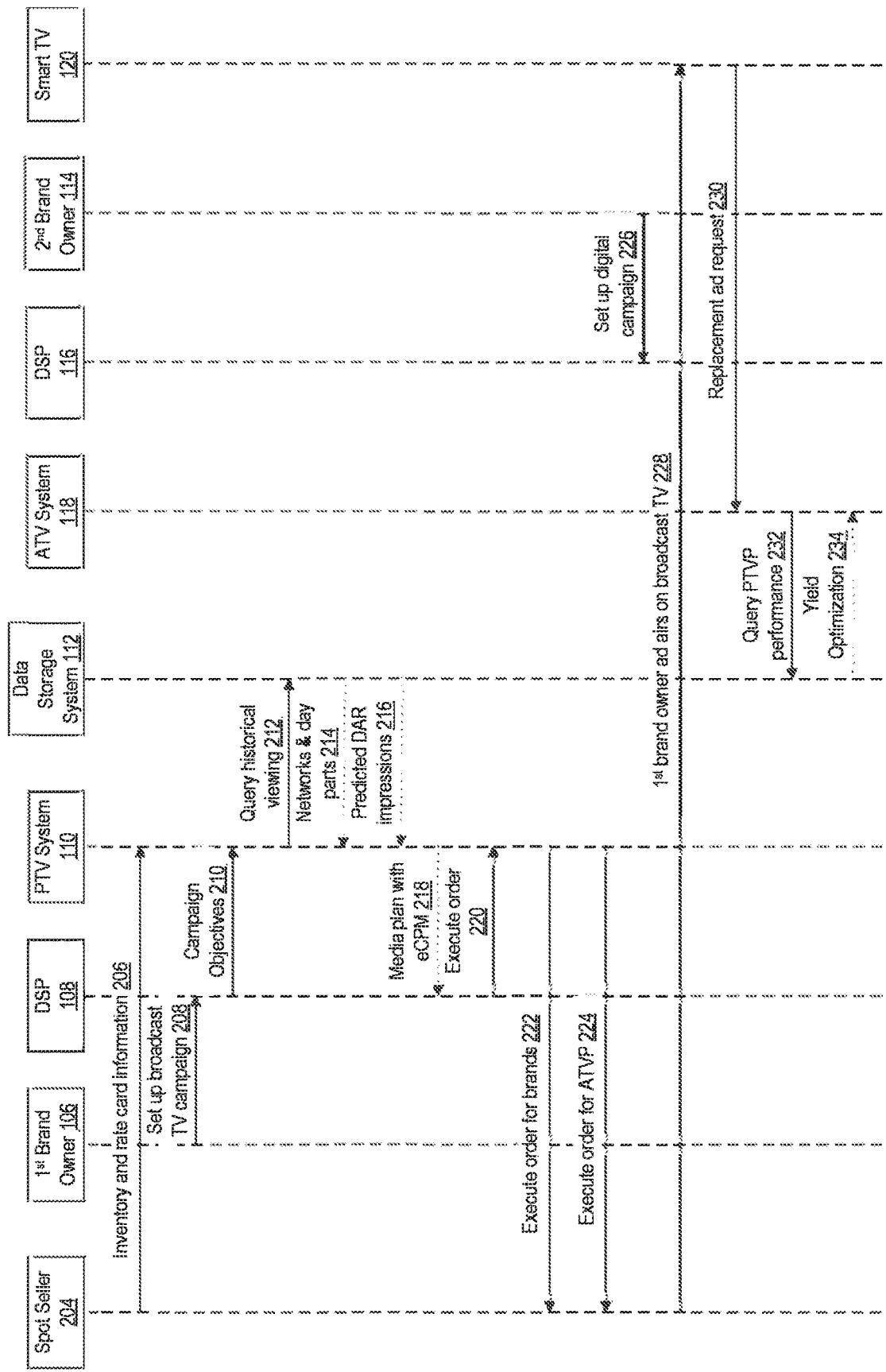
FIGS. 2A and 2B illustrate a sequence diagram that outlines systems and methods described herein according to one embodiment of the present disclosure.
Figure 2B:
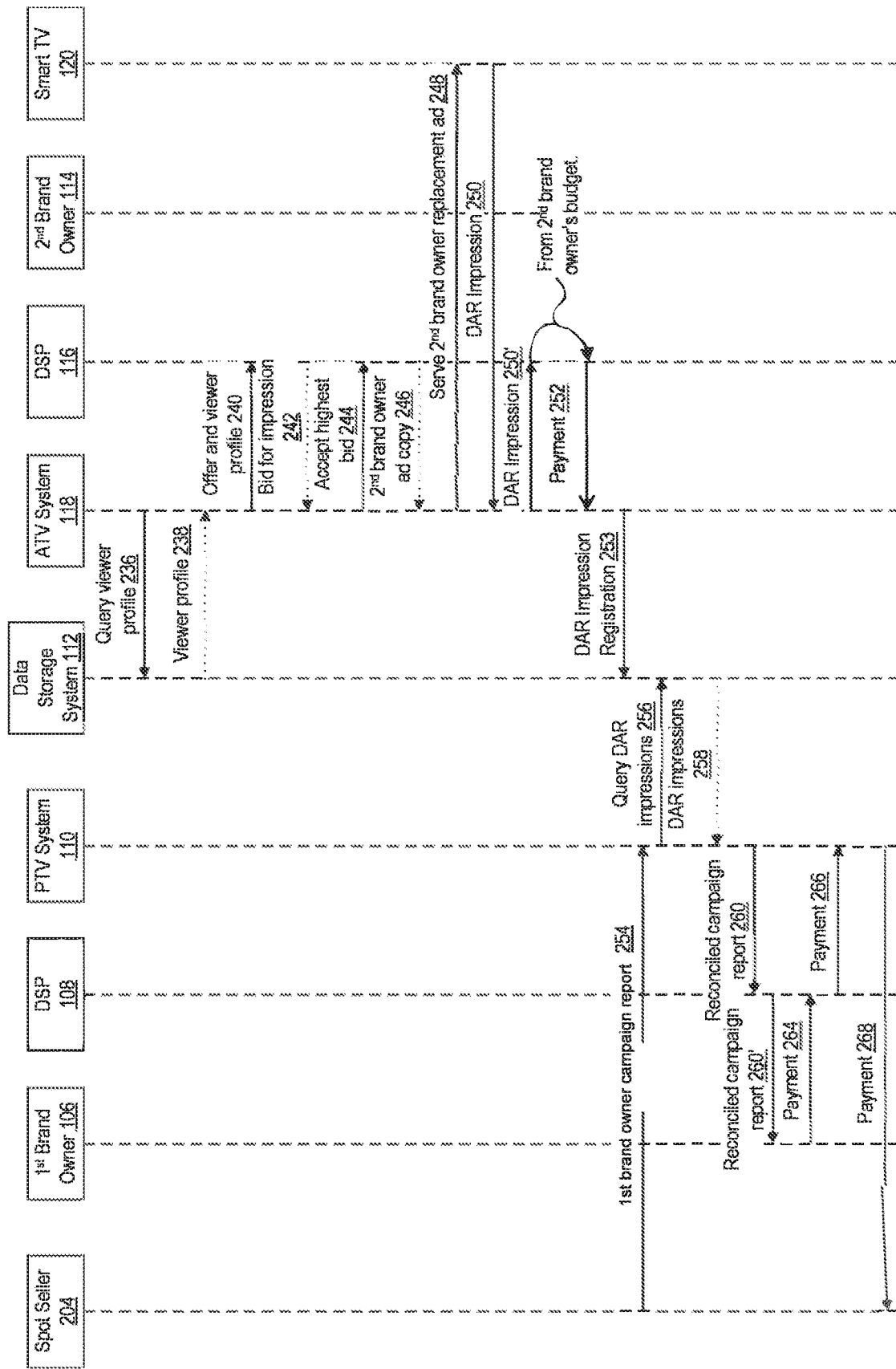

FIGS. 2A and 2B illustrate a sequence diagram that outlines a system, such as the system 100 of FIG. 1, and DAR-related methods described herein according to one embodiment. A spot seller 204 can include broadcasters, platform operators, cable networks, or media representative firms and has TV broadcast avails (e.g., inventory) to sell to advertisers that want to fill the TV broadcast avails with broadcast ads. The spot seller 204 provides a schedule of available broadcast ad inventory and a rate card outlining the cost of the available inventory to the PTV system 110 (206).

The first brand owner 106 can run a TV advertising campaign that includes broadcast TV advertising. The first brand owner can create the advertising campaign with the DSP computing system 108, which will manage the campaign on behalf of the first brand owner (208). The DSP computing system 108 can communicate the campaign objectives, including the available budget, the target audience and the desired number of impressions, to the PTV system 110 (210).

The data storage system 112 contains historical data about previous broadcast TV ad campaigns, previous dynamic ad replacement campaigns, viewer profiles and viewing patterns of those viewer profiles. The PTV system 110 can query the data storage system 112 for the broadcast TV networks and day parts (or specific times of day) that are most suitable for the campaign objectives provided by the first brand owner and the predicted DAR impressions that could be generated from those networks and day parts (212). The data storage system 112 can then send the networks and day parts information to the PTV system 110 (214) as well as a number of predicted DAR impressions for the particular inventory during those day parts on those networks (216).

The PTV system 110 analyzes the data received from the data storage system 112 to determine the most effective media plan that meets the campaign objectives of the first brand owner 106, which consists of the broadcast TV avails that are most suitable for the campaign and the cost per mille (CPM) (e.g., cost per thousand impressions or views), taking into account the available budget, the target audience and the desired number of impressions. The PTV system 110 can decide to discount the CPM for the buyer if the demand is significant enough from the ATV system 118 as will be discussed in more detail with reference to FIGS. 6, 7, 8A and 8B. The PTV system 110 and ATV system 118 can work together to reduce the effective CPM (eCPM) the first brand owner pays, where the eCPM is the cost for one thousand (1,000) ad impressions after removing the waste impressions that did not hit the target audience delineated within the ad campaign. For example, when an ad campaign costs $10,000 for 1,000,000 impressions, then the CPM would be $10.00. If, assuming 20% of those impressions are wasted on non-targeted audience, then the campaign has a cost of $10,000 for 800,000 effective impressions and the eCPM becomes $12.50.

The PTV system 110 returns the media plan with the eCPM to the DSP computing system 108 (218). When the media plan and eCPM are acceptable to the first brand owner, then the DSP computing system 108 is used to execute the order of the impressions in the PTV system 110 (220).

The PTV system 110, in turn and to fulfill the first brand owner's order, places spot buys with the spot seller 204 to secure the broadcast TV avails (222). The purchase includes the avails presented on the media plan plus a "top up" of additional impressions for the ATV system 118 (224). The PTV system 110 can determine the top up from information queried from the data storage system 112 in order to understand the ATV demand and the margins available through the PTV system spot buys. The ad copy can be distributed to the spot seller 204 by normal industry methods.

The second brand owner 114 wants to run a digital video advertising campaign that includes dynamic ad replacement (DAR). To do so, the second brand owner 114 can create an advertising campaign with the DSP computing system 116 that includes the available budget, the target audience and the desired number of impressions (226). At some later time, the broadcaster 104 (fronted by the spot seller 204) broadcasts the ad copy of the first brand owner in an avail that was purchased as part of the spot buy made by the PTV system 110 (228).

The smart TV 120 can use automatic content recognition (ACR) technology to identify that the ad copy of the first brand owner 106 is about to be displayed as part of the TV feed. Automatic content recognition can be based on fingerprinting, watermarking or other technology that enables the smart TV 120 to identify the content that is being viewed on the TV display. For example, fingerprinting technology processes individual video frames of the original content or the audio stream of the original content to produce a sequence of fingerprints. An ACR client, with the help of an ACR headend (FIG. 3) can then match the fingerprints against a similar sequence of fingerprints produced by the smart TV 120 to determine whether there is a match. Given a match, the ACR client can identify the content, e.g., as a program being streamed to a particular channel. As another example, watermarking technology inserts a code sequence into the individual video frames of the original content or the audio stream of the original content that is undetectable by human eye or ear. The smart TV 120 can extract the inserted code sequence to identify the content.

By understanding what TV feed or program the smart TV 120 is displaying, and utilizing a time lag between the original broadcast content and the same content being received and displayed by the smart TV 120, the ACR client can give advance notification that the ad copy of the first brand owner 106 is about to be displayed. As will be explained in more detail, the ATV system 118 can also send targeting criteria to the smart TV 120 to put the DAR ad on target when the broadcast ad is off target with regards to the smart TV user. The smart TV 120 can use the targeting criteria to create an ad request that the smart TV 120 can communicate to the ATV system 118 or to a third party supply side platform (230) to take part in an auction that ultimately fills the ad spot with a DAR ad.

The ATV system 118 can then query the data storage system 112 to determine the PTV performance of the underlying spot campaign (232). If the PTV spot is under performing, certain yield optimizations can be executed to improve performance (see FIGS. 7, 8A and 8B), which can be sent back to the ATV system 118 (234). The ATV system 118 can also query the data storage system 112 for a viewer profile of the user(s) of the smart TV (236). In response, the data storage system 112 can return the targeting profile of the smart TV user to the ATV system 118 (238).

When the broadcast TV ad is to be replaced, then the ATV system 118 offers the dynamic ad replacement impression along with the user's targeting profile for sale to the DSP computing system 116 through which the second brand owner 114 sets up a digital video advertising campaign that includes dynamic ad replacement (DAR) (240).

The DSP computing system 116 can use the provided viewer targeting profile to determine whether the offered dynamic ad replacement impression is on target and is valuable enough to bid on, in which case, the DSP computing system 116 submits a bid for the offered dynamic ad replacement impression to the ATV system 118 (242). If the bid submitted by the DSP computing system 116 is the highest bid, then the ATV system 118 accepts the bid from the DSP computing system 116 (244). The DSP computing system 116 can then send, to the ATV system 118, a reference to the ad copy that is to be used to replace the broadcast TV ad (246).

The ATV system 118 can respond to the replacement ad request from the smart TV 120 with the replacement ad from the second brand owner 114 (248). The smart TV can then play the replacement ad instead of showing the broadcast TV ad. After the smart TV 120 has played the replacement ad copy for two (2) seconds or some other predetermined amount of time, the smart TV 120 reports one or more replacement ad (DAR) impression to the ATV system 118, e.g., 0%, 25%, 50%, 75% or 100% according to one embodiment (250).

The ATV system 118 reports the same DAR impression to the DSP computing system 116, which is the DSP through which the second brand owner 114 has participated in an auction for the ad spot (250'). The DSP computing system 116 deducts the payment for the DAR impression from the budget of the campaign that was set up by the second brand owner and makes or registers this payment with the ATV system 118 (252). The ATV system 118 can then register the DAR impression with the data storage system 112, providing details of both the first brand owner as the original advertiser and the second brand owner as the replacement advertiser (253).

At a time after the TV ad campaign set up by the first brand owner 106 has completed (all purchased broadcast TV ad spots have been aired), the spot seller 204 or distributing partner submits a report to the PTV system 110 that details the ad spots in which the TV ad from the first brand owner 106 was broadcast as well as the audience impressions for those ad spots (254). Alternatively, the PTV system 110 can be integrated with the platforms of the spot seller or distributing partner, or with third party platforms, that can provide data on the performance of the ad spots in which the TV ad from the first brand owner 106 was broadcast, including the audience impressions for those ad spots.

The PTV system 110 can query the data storage system 112 for details of the DAR impressions in which the broadcast TV ad that was replaced, as corresponding to the campaign of the first brand owner (256). In response to the query, the data storage system 112 can send details about the DAR impressions to the PTV system 110 (258).

The PTV system 110 creates a reconciled campaign report by removing the number of audience impressions that correspond to the DAR impressions generated for each TV ad spot from the campaign report provided by the spot seller 204, as in those instances, the viewer of the smart TV 120 did not see the broadcast TV ad, but instead saw the dynamic replacement ad. The PTV system 110 submits the reconciled campaign report to the DSP computing system 108 (260), e.g., the DSP that was used by the first brand owner 106 to set up their broadcast TV ad campaign.

The DSP computing system 108 adds any revenue share or fees to the reconciled campaign report and submits the reconciled campaign report to the first brand owner 106 (260'). The first brand owner 106 makes payment for the broadcast TV ad campaign to the DSP computing system 108 (264). The DSP computing system 108 deducts any revenue share or fees from the payment received from the first brand owner 106 and then makes payment for the broadcast TV ad campaign to the PTV system 110 (266). The PTV system 110 can then make payment to the broadcaster 104 or spot seller 204 for the broadcast TV avails that were bought as part of the original broadcast TV ad campaign (268).

Figure 3:
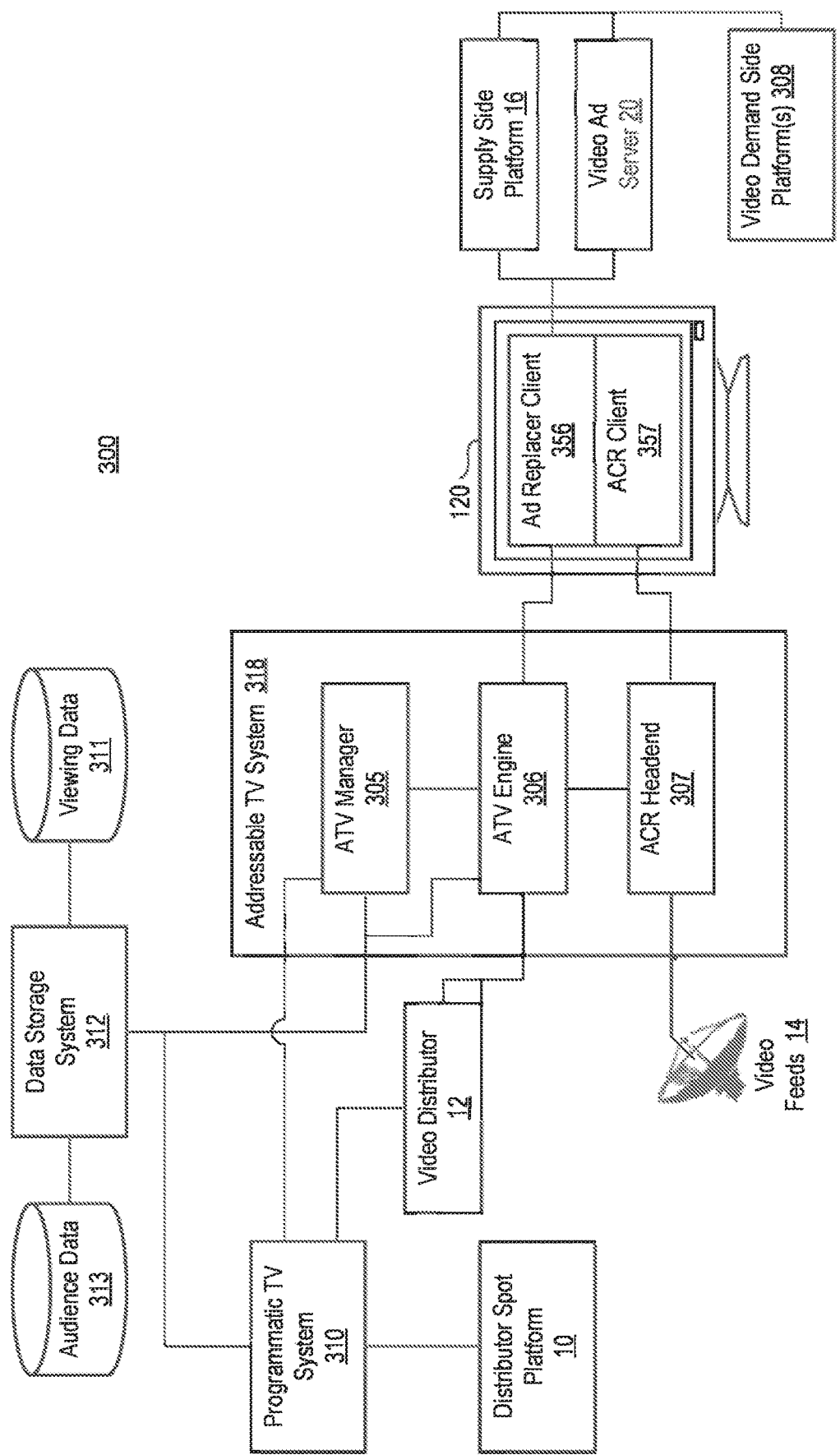
FIG. 3 illustrates a system for the creation, sale, purchase, fulfilment and reconciliation of dynamic ad replacement inventory according to another embodiment of the present disclosure.

FIG. 3 illustrates a system 300 for the creation, sale, purchase, fulfilment and reconciliation of dynamic ad replacement (DAR) inventory according to another embodiment of the present disclosure. The system 300 can include an addressable TV (ATV) system 318 performing dynamic ad replacement (DAR) on a smart TV 120 according to an embodiment of the present disclosure. The ATV system 318 can include an ATV manager 305, an ATV engine 306 and an automatic content recognition (ACR) headend 307. The ATV system 318 can be a single system, or can be a distributed system being executed on one or more power servers that specialize or are located to better execute the roles of the ATV manager 305, the ATV engine 306 and the ACR headend 307, respectively, as will be explained.

The ATV system 318 can be coupled to or in communication with a programmatic TV (PTV) system 310, a data storage system 312, a video distributor 12, video feeds 14 and a plurality of smart TVs, one smart TV 120 being depicted in FIG. 3. Each smart TV 120 can include an ad replacer client 356 and an ACR client 357. The video distributor 12 distributes video and related metadata to the ATV system 318. The PTV system 310 can further be coupled to or in communication with a distributor spot platform 10.

The data storage system 312 can include, or be coupled with, a viewing database 311 (with viewing data) and an audience database 313 (with audience data). The audience data can include information such as TV devices and other household metrics, e.g., income, marital status, children, what cars are owned, and any data that can be associated with the smart TV 120 or be obtained from a third party associated with IP addresses of smart TVs of individual consumer households. The viewing data can be obtained directly from viewing activity on the smart TVs 120, which can be updated over time as consumers continue to stream programming.

The smart TV 120 can be in communication with a supply side platform (SSP) computing system 16 and a video ad server 20, which in turn can be in communication with one or more video demand side platform (DSP) computing system(s) 308. These entities, through computing systems having processing capability and storage, can take part in automated live auctions to fill ad spots just in time with dynamic replacement ads, as will be discussed in more detail.

The ATV manager 305 can be run on one or more servers and provide web access. An application programming interface (API) can provide for insertion of ad spots for dynamic ad replacement through the ATV system 318. The API can provide a way that third parties can connect to the ATV system 318 to create and manage ad campaigns, upload ads, and perform other account-specific tasks. These third parties can create campaigns on a proxy basis for their advertisers.

The ATV manager 305 can also provide for user interface (UI) insertion of ad spots available for dynamic ad replacement. The ATV manager 305 can associate ad spots with an appropriate target audience and provide a forecast of a volume of off-target audience. The ATV manager 305 can further forecast a level of ATV CPM driven from the off-target audience.

The ATV manager 305 can further report any quality issues with ad spots and detection of ad spots. For example, the ATV system 318 can determine that the video that is being uploaded is of sufficient quality to be ACR detected, e.g., that the aspect ratio is adequate and that the bit rate is not too low. The ATV manager 305 can further ensure that a fingerprint of an ad is adequate and detectable, and flag the ad when the bit rate is too low to be fingerprinted. The ATV manager 305 can perform tests on ingested ad spots on supported devices, to be sure that candidate replacement ads will appropriately stream and be viewed on those devices. The ATV manager 305 can also ensure the ad spots are detected appropriately, e.g., through ACR, and flag any detection issues. Ensuring these qualities and proper detection provide that the DAR ads of addressable advertisements are properly delivered.

The ATV manager 305 can further send ad spots to the ATV engine 306 for ad replacement and provide real time reports on ad replacement versus ad spot fulfillment by broadcasted ads. The ATV manager 305 can also provide real time capability of amending a target audience. For example, the ATV manager 305 can detect a lot of impressions coming in from a certain audience (e.g., thirty-something males looking for power tools in New England). A campaign manager could log into the ATV manager 305 and be presented with this specific audience and a streamlined ability to make that audience a new targeted audience for the campaign. This capability allows for adjusting, mid-flight of the campaign, what types of impressions are considered "on-target" for the campaign.

The ATV manager 305 can further associate a minimum CPM expected for an ad spot within the ATV system 318, and can send ATV impressions to the PTV system 310. The ATV manager 305 can also report on waste reduction performance and on addressable DAR performance, which will be discussed in more detail. Waste reduction refers to efforts to make an increased percentage of delivered ads be on target for ad spots streaming to a certain type of audience. The ATV manager 305 can also receive payment from the addressable (ATV) advertisers or agents and send payments to the spot submitters (e.g., broadcaster or broadcasting partners) for replaced ads when revenue sharing with the spot submitters.

The ATV engine 306 can run on one or more servers (or other computing device) and receive requests from smart TVs 120 for ad replacement. The ATV engine 306 can further determine whether an ad spot is off target using the target audience campaign with which it was set up. The ATV engine 306 can retrieve audience data and viewing data from the data storage system 312, and analyze this data to determine whether ads are on target or off target for a particular ad spot. The ATV engine 306 can further notify a smart TV 120 to replace an ad according to yield optimization, to increase eCPM of a campaign as will be explained in more detail (FIGS. 6, 7, 8A and 8B.) The ATV engine 306 can also send various criteria or parameters to the smart TV 120 with which the ad replacer client 356 can formulate an ad request to replace a broadcast ad with an addressable ad. These criteria can include, but not be limited to, demographics, geographic information, the language the smart TV is set on, and the like. The more criteria for use in formulating the ad request, the more valuable to an (addressable ad) bidder that is deciding whether to bid on the ad spot.

The ACR headend 307 can run on one or more servers (or other computing device(s)) and monitor live streams coming from the video feeds 14 ahead of time of delivery of the live streams to the smart TV 120. The ACR headend 307 can, therefore, ingest an ad spot and a broadcast ad that is to be replaced according to the DAR methods disclosed herein. The ACR headend 307 can fingerprint ad spots and store the fingerprint for comparison, to be able to detect the ad spots within the monitored live streams. The ACR headend 307 can then notify the ARC client 357 that is on a TV channel that an ad spot is coming that can be filled by a replacement ad, and when the ATV system 318 provides that replacement ad, an identity of the replacement ad.

The video feeds 14 can include high quality video feeds such as high definition, 4K, ultra-high definition video feeds and the like. The video feeds are provided before the smart TVs receive the video feeds, and thus with sufficient time to identify ad spots and replacement ads to be delivered to the smart TVs.

The smart TV 120 can determine whether the smart TV is in a state to monitor ACR activity. When ACR capability is activated, the smart TV 120 can pass matched ACR events to the ad replacer client 356. These ACR events can each include content ID (or a key) from the ACR headend 307 with which to match a particular ad campaign. Knowing the ad campaign, the ATV engine 306 can determine whether an ad is on or off target, for example. The smart TV 120 can further provide temporary or permanent storage for ad replacement video from the video ad server 20. The smart TV 120 can further facilitate the playout of ad replacement video either through a native player or through a web player executed within the ad replacer client 356.

The ACR client 357 can be integrated at a lower code level of the smart TV's electronics (e.g., in firmware, for example) where the ACR client 357 can query frames of streaming video via the smart TV's input sources, such as that deliver traditional broadcasting or over-the-top (OTT) streaming. Over-the-top (OTT) streaming refers to delivery of audio, video and other media over the Internet without the involvement of a multiple-system operator in the control or distribution of the content. The OTT content is delivered to an end-user device, leaving an Internet service provider (ISP) only with the role of transporting Internet protocol (IP) packets. For either functionality, the ACR client 357 can be adapted to interact with a chipset manufacturer for the smart TV to gain access to individual video frames being displayed on the screen.

When activated by the smart TV 120, the ACR client 357 can send the frames of a video feed to the ACR headend 307 to be matched to fingerprints stored by the ACR headend 307. The ACR client 357 can send matched events (e.g., matched content or fingerprints of live video feeds) through to the smart TV 120 and/or the ad replacer client 356. The ACR client 357 can further monitor for any changes to the matched channel or video, e.g., whether the channel or video stream has changed, immediately upon detection of a matching break. In one embodiment, the ACR client 357 can signal to the ad replacer client 356 to download an application and pass in TV/client parameters such as network ID, channel it's on (channel ID), what video is detected, current time and the like that is useable by the ad replacer client 356 to perform ad replacement.

The ad replacer client 356 can operate at an application level of an operating system of the smart TV 120, and can be executed as a software development kit (SDK) pre-installed on the operating system or installed later as an application on the smart TV 120 by a consumer. The application can be, in one embodiment, executed in JavaScript® (of Oracle) that runs from the smart TV's browser and displays various different experiences. Those experiences can include the replacement of video (e.g., of a broadcast ad) at a precise time, which timing information can be received from the ACR client 357.

More specifically, in one embodiment, the ad replacer client 356 can listen for ad replacement events from the smart TV 120, and receive information necessary to send a call to the ATV engine 306 to prepare to make an ad replacement on the smart TV. Upon receipt of an ad replacement event, the ad replacer client 356 can query the ATV engine 306 to confirm whether a broadcast ad is on or off target for the ad spot. When the ad spot is off target, the ad replacer engine can request a new (or replacement) video ad from the SSP computing system 16, providing audience parameters as received from the ATV engine 306. In another embodiment, the request is to the addressable TV system 318, which can also perform the role of an SSP computing system to provide a replacement ad to the smart TV. The ad request can include the criteria and/or parameters received from the ATV engine 306 that relate to the ad campaign for an on-target ad.

Upon a successful bid on the ad request (e.g., by a video DSP computing system 308), the ad replacer client 356 can receive the replacement ad from the appropriate video ad server 20 (or from the addressable TV system 318 itself in some embodiments). The SSP computing system 16 (or the addressable TV system 318) can act as an advertisement exchange for addressable replacement ads in holding a real-time, automated auction for the ad spot. The SSP computing system 16 (or addressable TV system 318) can then notify the smart TV 120 of the successful bid and the bidder.

The ad replacer client 356 can then download the replacement ad and store it in temporary or permanent storage. The ad replacer client 356 monitors the download speed in respect to the file size to establish if enough of the video has been downloaded to play all the way through without buffering. At the point the video can play through seamlessly, the ad replacer client 356 can signal the smart TV 120 that the replacement ad can be played, or the ad replacer client 356 can play the replacement ad at the appropriate time within its own browser.

The ad replacer client 356 can further monitor the smart TV 120 for channel/video change events from the ACR client 357, and remove the replacement ad as appropriate. The ad replacer client 356 can detect a channel change by receiving a channel change signal from the ACR client 357, and in response, cancel or pull down the dynamic ad replacement that no longer applies to coming ad spots, which likely differ from the previous upcoming ad spot. This decision should be made within a second or so (or less) so that DAR functionality can keep up.

The ad replacer client 356 can further monitor for a UI being invoked natively or via HDMI or other means such as an electronic programming guide (EPG). The ad replacer client 356 can remove a replacement ad or otherwise respond as soon as possible, which can involve even an anticipation of a channel or status change impacting the delivery of the replacement ad. The ad replacer client 356 can also send quartile impressions to the ATV engine 306 for purposes of tracking and campaign ad fulfillment. "Quartile" is a fourth of an ad, such that once at least a fourth of the ad is played, an impression can be reported.

The SSP computing system 16 can integrate with DSP computing systems 308 or other exchanges to expose video ad inventory (e.g., ad slots). The SSP computing system 16 can programmatically provide detail around an expected video stream and data related to an expected audience of the ad inventory. This information can be provided to the addressable TV system 318 or otherwise stored within the databases of the data storage system 312. The SSP computing system 16 can further allow multiple DSPs to bid for ad slots within the video ad inventory. This bidding process is automated so that it can take place quickly. The SSP computing system 16 can notify the winning bidder and download the replacement ad for the winning bidder. The replacement ad can then be sent to the ad replacer client 356 to be streamed within the correct ad slot. The SSP computing system 16 can also facilitate the formation and execution of rules dictating who can bid and other ad exchange parameters driving the bidding. One such rule can include minimum pricing, for example.

The video ad server 20 can allow API ingestion of video to be served to the smart TV 120. The video ad server 20 can also facilitate video ads to be served in multiple bandwidths and profiles, and manage significant bursts of load without degradation. The video ad server 20 can also receive (via impressions) and report (via an API) performance of video ads.

Figure 4:
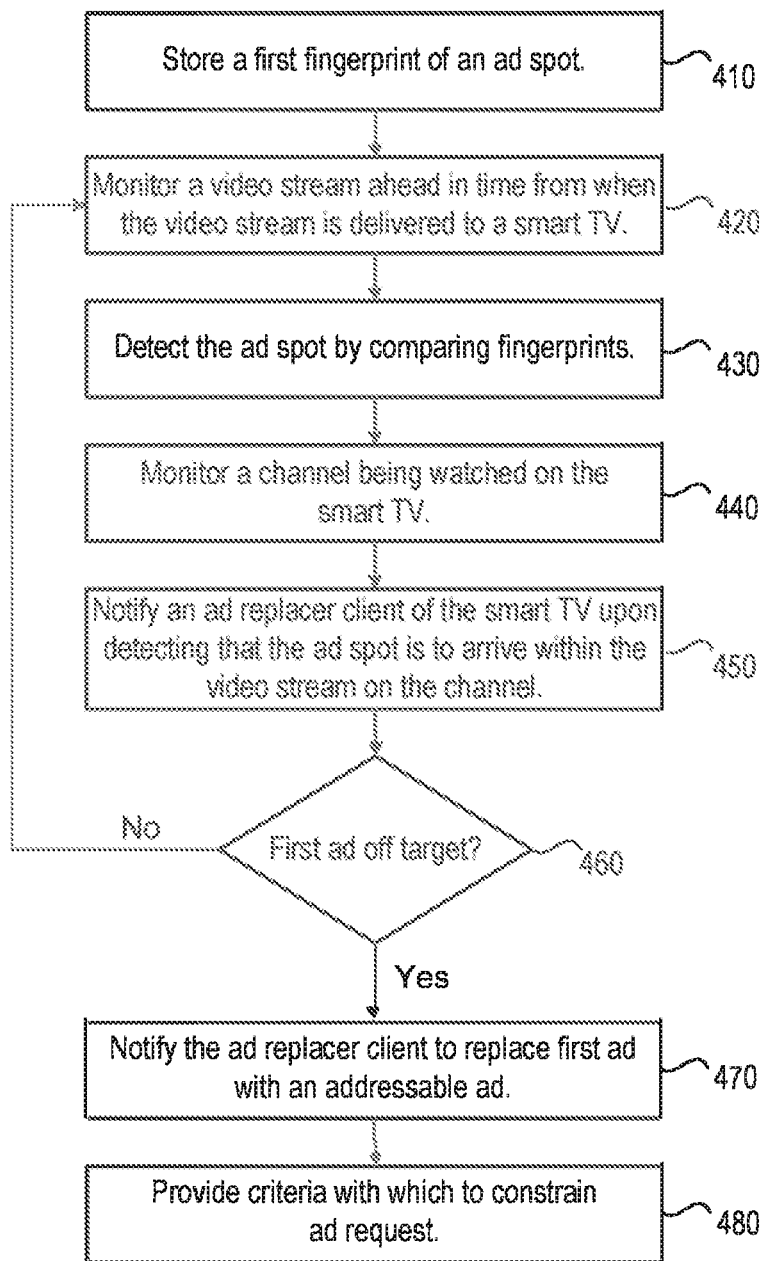
FIG. 4 is a flowchart of a method of dynamic ad replacement according to an embodiment of the present disclosure.

FIG. 4 is a method of dynamic ad replacement according to an embodiment of the present disclosure. The method can be executed by the addressable TV system 318, including the ACR headend 307 and the ATV engine 306. The method can begin with storing, by the ACR headend, a first fingerprint of an advertisement (ad) spot (410). The method can continue by the ACR headend monitoring a video stream ahead in time from when the video stream is delivered to a smart television (TV) (420). The method can continue by the ACR headend detecting the ad spot by comparing a second fingerprint, which is captured of the ad spot during monitoring, with the first fingerprint (430). The method can continue by the ACR headend monitoring a channel being watched on the smart TV (440). The method can continue by notifying an ad replacer client of the smart TV upon detecting that the ad spot is to arrive within the video stream on the channel (450).

The method of FIG. 4 can continue by the ATV engine determining whether, in view of data from an ad campaign, a first ad to be delivered to the ad spot is off target for the ad spot (460). The method can continue by the ATV engine notifying the ad replacer client to replace the first ad with an addressable ad when the first ad is off target for the ad spot (470). The method can continue by the ATV engine providing criteria with which to constrain an ad request to obtain a second ad that is on target for the ad spot. The ad replacer client can then send an ad request with one or more parameters provided within the criteria to obtain an ad that is on target for the ad spot.

Figure 5:
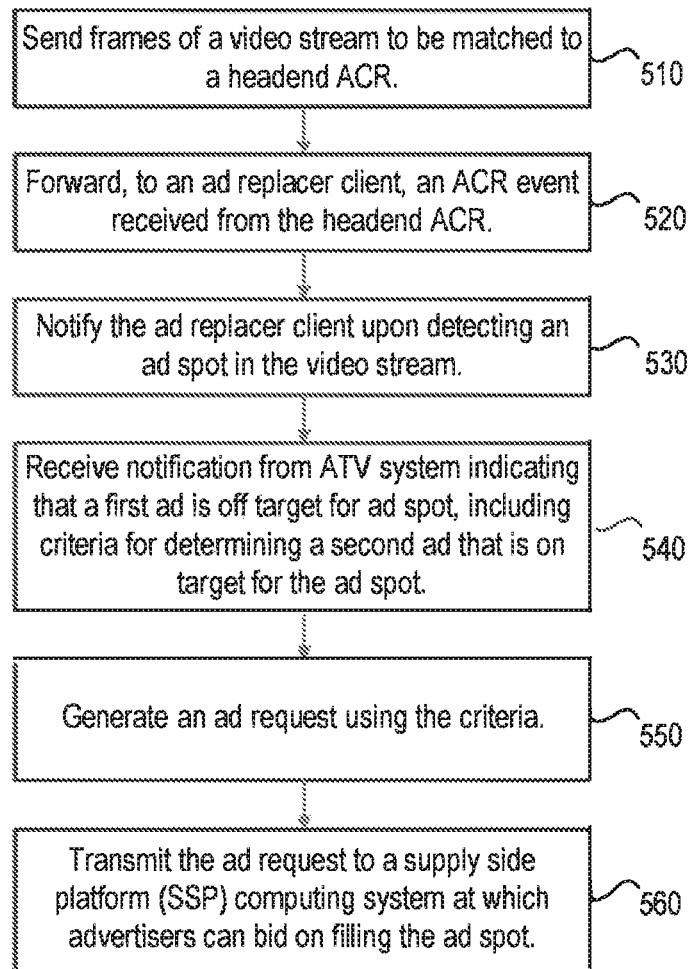
FIG. 5 is a flowchart of a method of dynamic ad replacement according to another embodiment of the present disclosure.

FIG. 5 is a method of dynamic ad replacement according to another embodiment of the present disclosure. The method can be executed by a smart TV 120, and particularly an ad replacer client 356 and an ACR client 357 of the smart TV 120. The method can begin by the ACR client sending frames of a video stream to be matched to a headend ACR of an addressable television (ATV) system (510). The method can continue by the ACR client forwarding, to the ad replacer client, an ACR event received from the headend ACR that identifies a channel on which the video stream is playing (520). The method can continue by the ACR client notifying the ad replacer client upon detecting an ad spot in the video stream (530).

The method can continue by the ad replacer client receiving a notification from the ATV system, wherein the notification indicates that a first ad destined for the ad spot is off target for the ad spot, and includes criteria for determining a second ad that is on target for the ad spot (540). The method can continue by the ad replacer client generating an ad request including one or more parameters from the criteria (550). The method can continue by the ad replacer client transmitting the ad request to a supply side platform (SSP) computing system at which advertisers will bid on filling the ad slot with the second ad (560).

With further reference to FIGS. 1 and 3, the programmatic TV (PTV) system 110 or 310 can further offer waste reduction by offering addressable impression for higher CPM to first brand owners 106, e.g., through the distributor spot platform 10. The PTV system 110 or 310 can find the most appropriate available spot for an audience and budget of an ad campaign. The PTV system 110 or 310 can further forecast (or present an already developed forecast) of possible inventory hit due to waste correction.

To perform this forecast, the PTV system 110 or 310 can build up the audience database 313 and the viewing database 311, to inform what kind of audience is generally on-target and generally off-target for a particular day-part campaign. The PTV system 110 or 310 can further show to a particular client (DSP) how much the client could save by using dynamic ad replacement. The PTV system 110 or 310 could be specific to a day-part and network and understand which audience is watching at what time. The PTV system 110 or 310 can predict, through campaign data and viewing data, a percentage of waste that is likely. Waste refers to a number of impressions that do not hit the target audience delineated within an ad campaign due to being off-target for the target audience. A good goal for waste reduction, for example, is to reduce waste below 20% of total impressions.

By way of waste reduction, the PTV system 110 or 310 can forecast (or present an already developed forecast) of addressable impressions for higher CPM to a client, e.g., to a DSP computing system that is developing an ad campaign on behalf of advertisers. The PTV system 110 or 310 can use data retrieved from the data storage system 312 to predict how many waste saving impressions can be generated with addressable impressions through the ATV system 118 or 318.

The PTV system 110 or 310 can also manipulate media plans, e.g., ad campaigns, to provide maximum inventory for ATV production (also referred to herein as yield optimization). The PTV system 110 or 310 can then send insertion orders for broadcasters and platforms in accordance with revised ad campaigns. The PTV system 110 or 310 can also receive order statuses from broadcasters, DSPs and SSPs, and present a final order to an advertiser or agent.

The PTV system 110 or 310 can also make payments to the broadcasters, DSPs and/or SSPs, reconcile impressions according to agreed measurement metrics minus addressable impressions delivered via the addressable TV system 118 or 318. The PTV system 110 or 310 can report on spot campaign performance, on waste reduction performance and on addressable ad performance. The PTV system 110 or 310 can also receive payments from advertisers or their agents, and make payment to the ATV system 118 or 318 for waste reduction campaigns.

The PTV system 110 or 310 can also distribute video metadata to the ATV system 118 or 318, where a replacement ad for DAR can come from either the ATV system 118 or 318 or from the video ad server 20 as explained above. Once a commitment is made through the PTV system to buy an ad from an advertiser, the PTV system 110 or 310 can expose the ad to the ATV engine 306 for ingestion and to get ready to perform either yield optimization or waste reduction, as will be discussed in more detail.

The PTV system 110 or 310 can also distribute campaign data to the ATV system 118 or 318. Once this campaign data is programmatically ingested, the PTV system 110 or 310 can present to the ATV system 118 or 318 corresponding video metadata, such as ad identifier (ID), campaign ID, what brand it is, and the like, which should, at a minimum, inform the ATV system 118 or 318 what ad is to be delivered, who it is coming from, and what is the target audience(s). This campaign data can be fronted by the PTV system 110 or 310, or can come from a third party that is providing the ad.

The distributor spot platform 10 can work with the PTV system 110 or 310 to offer waste reduction, e.g., can be a source of addressable impressions offered for higher CPM. Accordingly, the distributor spot platform 10 can forecast (or help the PTV system to forecast) possible inventory hits due to dynamic ad replacement. The distributor spot platform 10 can further distribute campaign data and corresponding video and video metadata to the ATV system 118 or 318.

The following describes yield optimizations according to various embodiments. There are a number of ways that the PTV system 110 or 310 and the ATV system 118 or 318 can work together to increase the total yield.

Figure 6:
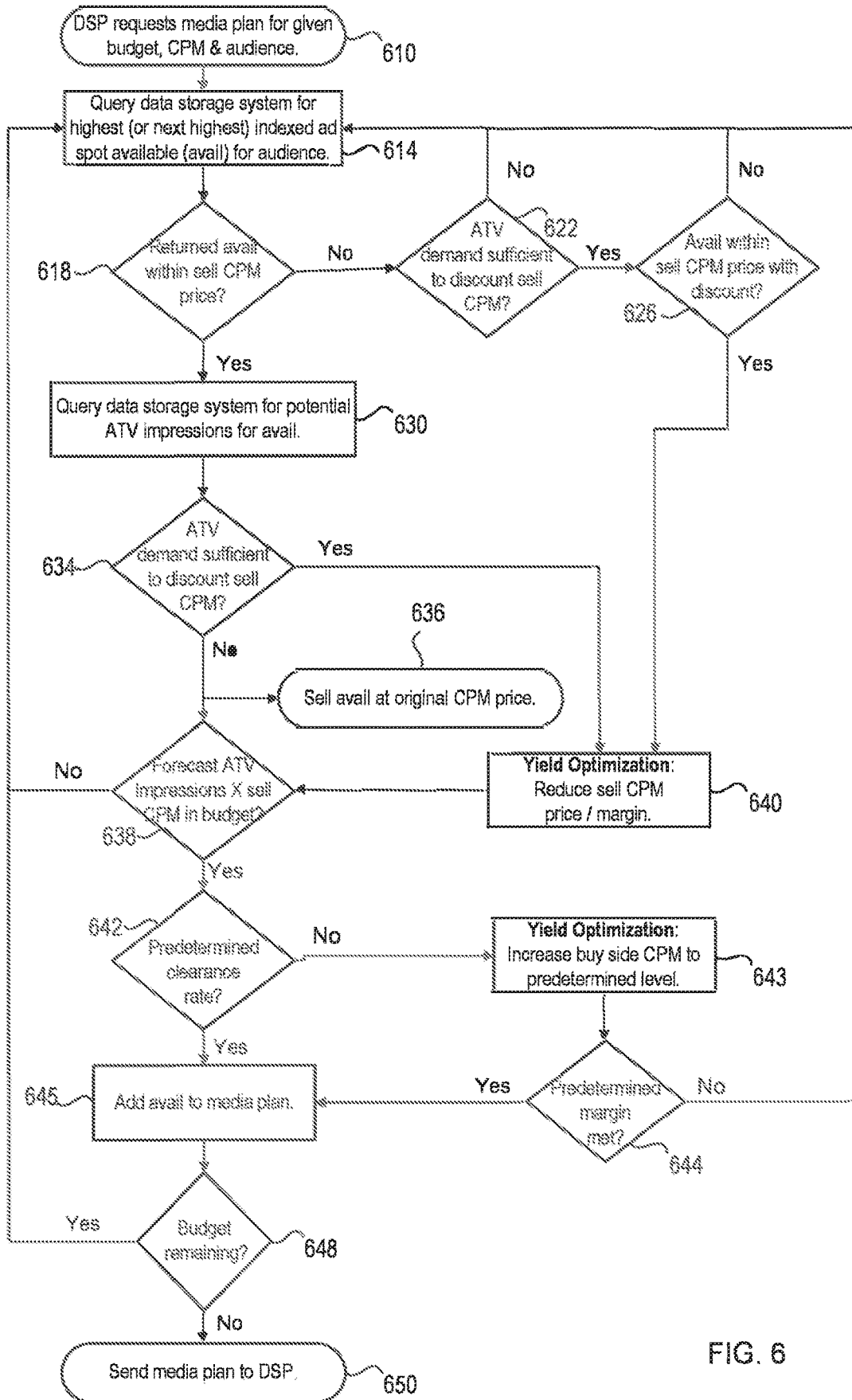
FIG. 6 is a flowchart of a method of yield optimization to improve programmatic TV (PTV) campaign performance by dynamically adjusting for how much to sell PTV inventory according to one embodiment of the present disclosure.

FIG. 6 is a flow chart of a method of yield optimization to improve programmatic TV (PTV) campaign performance by dynamically adjusting for how much to sell PTV campaigns according to one embodiment of the present disclosure. In this embodiment, the PTV system 110 or 310 can discount the sell cost-per-mille (CPM) price of a proposed PTV media plan to increase generation of inventory for the ATV platform, and make up any lack of revenue on the PTV campaign from the ATV system. In one embodiment, the method of FIG. 6 can be executed by a computing device such as the DAR manager 102, the PTV system 110 or 310, the ATV system 118 or 318, or a combination thereof.

When a media plan is being compiled, the DAR manager 102 (or more specifically, the programmatic TV (PTV) system 110 or 310) can automatically evaluate the likely demand for the spot from the addressable TV (ATV) system 118 or 318 based on data available that is related to, by way of example:

average ATV CPM demanded for an ad spot at that day part and network;

average success rate of selling an ATV ad spot at that day part and network;

average number of addressable devices at that day part and network; and expected audience waste of the underlying PTV ad calculated on the average audience at that day part and network.

Additionally, the PTV system can serve a dummy request to the digital DSP computing systems to see what the CPM is priced at for several of the most frequent audiences. Based on the above inputs, the PTV system can choose to discount the sell CPM price for the purchasing DSP computing systems. This will effectively reduce the margins of the PTV system 110 or 310, but ensures the risk to do so is more than counteracted by the likely demand and revenue the ATV system 118 or 318 can drive from those ad spots (inventory). When the above inputs show there will be little or no gain from selling the ATV inventory, the PTV system can choose not to discount the CPM for the DSP computing system and maintain its margins.

With further reference to FIG. 6, the DSP computing system can request a media plan for a given budget, CPM pricing and target audience (610). The PTV system can then query the data storage system 112 or 312 for a highest (or next highest) indexed ad spot available (or an avail) for the target audience, e.g., a target ad (614). The PTV system can then determine whether the returned avail is within a sell CPM price for the target audience (618). When the avail is not within the CPM sell price, the PTV system can determine whether there is sufficient demand for the avail from the addressable television (ATV) impressions to discount the sell CPM price (622). For example, the PTV system can determine whether projected ATV impressions are beyond a predetermined threshold that is sufficient to discount the CPM price of the target avail for the target audience, wherein the ATV impressions are derived from directly addressable replacement ads.

When the demand for the ATV impressions is sufficient, the PTV system can determine whether the target avail is within the sell CPM price with a determined discount in the CPM price (626). If the answer is no to both questions (blocks 622 and 626), then the method can loop back to block 614 and query the data storage system for a top-ranked avail for the target audience, and restart from block 614. When the answer is yes to both questions (blocks 622 and 626), then the PTV system can discount the sell CPM price for the target avail by the determined discount that decreases a margin for the PTV media plan (640).

When the answer is no at block 618, and the target ad is within the sell CPM price, then the PTV system can query a database of the data storage system to determine a potential number of ATV impressions for the avail (630). The PTV system can then determine whether the demand for the ATV impressions is sufficient to discount the sell CPM price of the target avail for the target audience, e.g., is greater than a predetermined threshold (634). When the answer is yes, that the demand is sufficient, then the PTV system can discount the sell CPM price for the target avail by the determined discount that decreases a margin for an ad campaign when filling the avail with a broadcast ad (640). When the answer is no (that the demand is insufficient) then the PTV system can sell the target avail at an original CPM price responsive to determining that the demand for the target avail as ATV impressions is less than the predetermined threshold (636).

From either block 640 or block 634, the PTV system can also determine whether a forecast of a number of the ATV impressions multiplied by the sell CPM price is within a budget for the ad campaign (638). When the answer is yes, the PTV system can determine whether there is satisfactory or predetermined clearance buy-side CPM (e.g., in the last year, 90% of the time the spot seller has accepted a CPM at this price for the proposed avail) (642). When the answer is no to block 642, the PTV system can increase a buy side CPM to a predetermined level to achieve clearance (e.g., acceptance of an order) from the spot seller (643). After increasing buy side CPM in block 643, the PTV system can determine whether a predetermined campaign margin for the avail is met (e.g., a 10% margin between the buy-side and the sell-side CPM) (644). When the answers to blocks 642 and 644 are yes, the PTV system adds the avail to a media plan for an advertiser when the forecast of the number of PTV impressions multiplied by the sell CPM price is within the budget for the ad campaign (645). The PTV system can also determine whether there is any budget remaining after adding the avail to the media plan (648). If there is budget remaining (or the answer is no at block 638 or at block 644), the PTV system can continue searching for target avails by looping back to block 614. When there is not sufficient budget remaining, however, the PTV system can send the (now complete) media plan to the DSP computing system (650).

Additional yield optimization can occur when the decision is needed whether to replace a PTV ad (e.g., a broadcast ad) or not. The system can monitor in real-time how the PTV ad campaign is performing. When an addressable spot presents itself, and it is determined that the underlying PTV ad is on target for that spot's audience and the campaign is not performing well, the system can decide to increase the ATV sell CPM price in a way to sell that inventory either to a party that is willing to pay a high enough premium; or, if the demand is not there, to sell at that price point to provide that impression back to the underlying PTV video. This can result in increasing the PTV campaign performance, or driving higher revenue for the ATV system. Alternatively, or additionally, the system could be configured to not serve such ads on target spots of the ATV system in order to hit campaign guarantees on the PTV system side.

Figure 7:
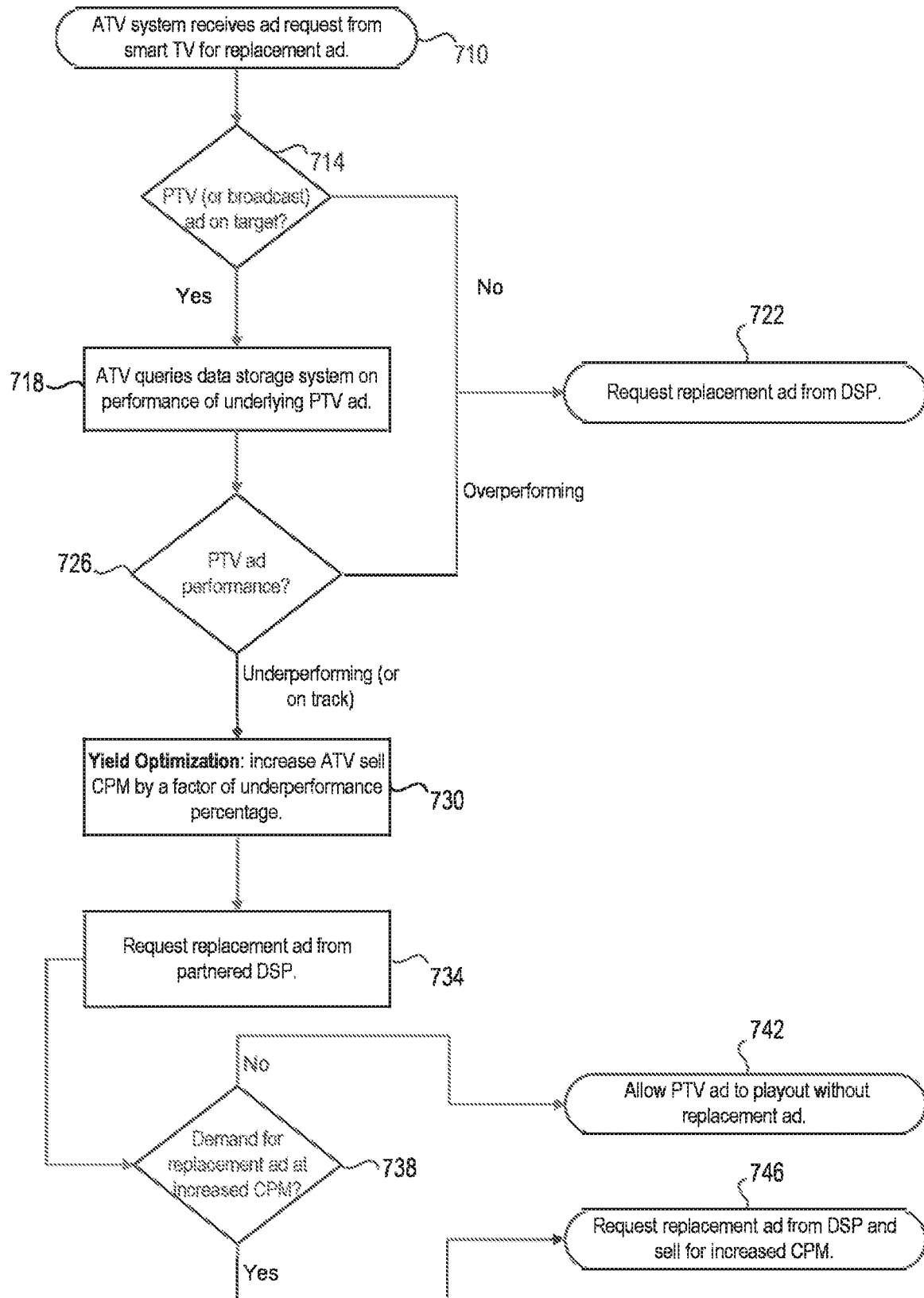
FIG. 7 is a flowchart of a method of yield optimization to improve overall campaign performance by adjusting ATV sell CPM price according to PTV campaign performance.

More particularly, FIG. 7 is a flowchart of a method of yield optimization to improve overall campaign performance by adjusting ATV sell CPM price according to PTV campaign performance. The method of FIG. 7 can be performed by the ATV system 318, and in one embodiment, by the ATV engine 306 of the ATV system 318. More particularly, the ATV system receives an ad request from a smart TV 120 for a replacement ad to be delivered to an ad spot (710). The ATV system can then determine whether the PTV (or broadcast) ad is on target for the ad spot (714). If the broadcast ad is on target, the ATV system can query the data storage system 312 regarding performance of the broadcast ad (718). If the broadcast ad is off target, the ATV system can request a replacement ad from a demand side platform (DSP) computing system (722). When the broadcast ad is on target, the ATV system can further determine whether the broadcast ad is underperforming (or on track) or overperforming (726). Responsive to determining that the broadcast ad is overperforming, the ATV system can request a replacement ad from the DSP computing system (722).

Responsive to determining that the broadcast ad is underperforming with relation to a target performance for the ad campaign, the ATV system can increase a sell CPM price of addressable TV (ATV) impressions for the ad spot by a percentage by which the broadcast ad is underperforming (730). The ATV system can then request a replacement ad from a partnered demand side platform (DSP) computing system (734). The ATV system can further determine whether a demand for the replacement ad is at an increased CPM price (e.g., higher than the sell CPM price previously applied) (738). When the answer is no to block 738, the ATV system can allow the broadcast ad to playout without ad replacement (742). When the answer is yes to block 738, the ATV system can request the replacement ad from the DSP computing system and sell the replacement ad for an increased CPM price (746).

An additional measure to improve campaign performance on the PTVP is to serve those campaigns via the ATV system in places where the underlying ad is off target on a specific TV but on target for another PTV campaign that is underperforming. The ATV system can increase the minimum CPM price it is willing to accept proportionally to the amount the broadcast ad is underperforming. This can drive more impressions to the PTV system campaign, or alternatively, bring in greater revenue to the ATV campaign for the same ad spots (or avails). When there is no PTV ad underperforming or available for the audience in question, the replacement inventory can be presented to the DSP computing system with no minimum CPM.

Figure 8A:
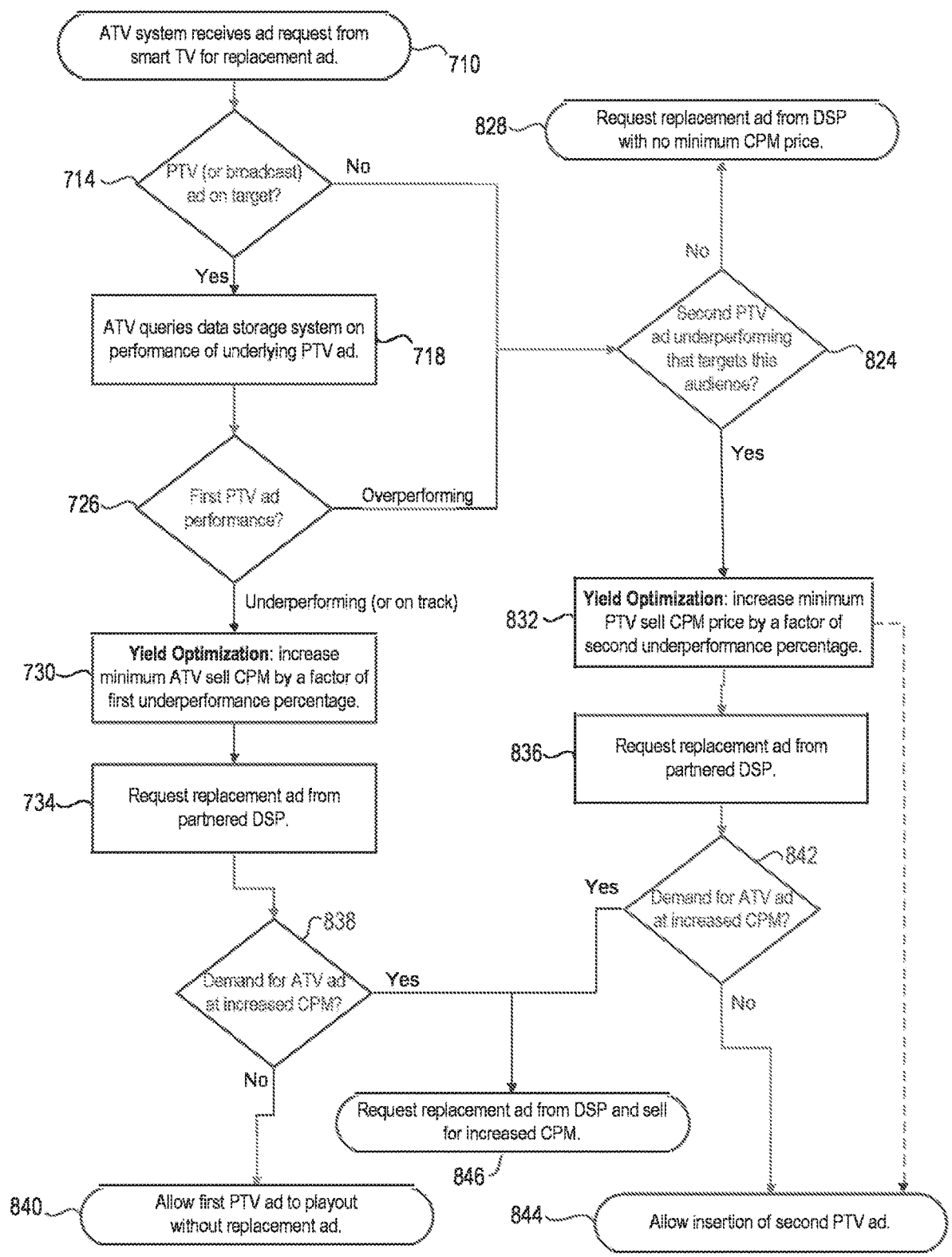
FIG. 8A is a flowchart of a method of yield optimization to improve overall campaign performance by adjusting a minimum sell CPM price for a PTV (or broadcast) ad when not replacing the PTV ad with a replacement ad at no minimum CPM price.

More particularly, FIG. 8A is a flowchart of a method of yield optimization to improve overall campaign performance by adjusting a minimum sell CPM price for a broadcast ad when not replacing the broadcast ad with an ATV ad at no minimum CPM price. The steps 710 through 734 of FIG. 8A are the same as those discussed with reference to FIG. 7. Note, however, that the ad analyzed in block 726 as to performance is a first PTV ad, and thus in block 730, the underperformance is referred to as a first underperformance percentage by which the minimum ATV sell CPM price can be increased. Furthermore, after a request for a replacement ad from a partnered DSP (734 from FIG. 7), the ATV system can determine whether a demand for an ATV ad exists at the increased ATV sell CPM price (838). When the answer is no, the ATV system can allow the first PTV ad to playout without a replacement ad (840). When the answer is yes, the ATV system can request a replacement ad from a DSP and sell the replacement ad for increased CPM (844).

When the ATV system determines that the broadcast (or first PTV) ad is not on target (714) or that the first PTV ad is overperforming (726), the ATV system can determine whether a second PTV ad is underperforming and that is on target for the ad spot for which the ad request is received (824). If the answer in block 824 is no (e.g., the second PTV ad is overperforming or on target for a second ad campaign), the ATV system can request a replacement ad from the DSP computing system with no minimum sell CPM price (828). If the answer in block 824 is yes, the ATV system can increase the minimum sell CPM price for the second PTV ad by a percentage of underperformance of the second broadcast ad, to an updated sell CPM price (832). In one embodiment, the ATV system can then allow the PTV system to deliver the second PTV ad to the ad spot so that the second PTV ad can generate the impressions and improve performance of the second ad campaign (844). Or, the ATV system can first request a replacement ad from a partnered DSP (836).

When first requesting the replacement ad, the ATV system can determine whether a demand for the ATV ad exists at the increased ATV sell CPM price (842). When the answer is no to block 842, the ATV system can signal the smart TV to allow insertion of the underperforming second PTV ad (844). When the answer is yes to block 842, the ATV system can request the replacement ad from the DSP computing system and sell the replacement ad for an increased CPM price (846).

Figure 8B:
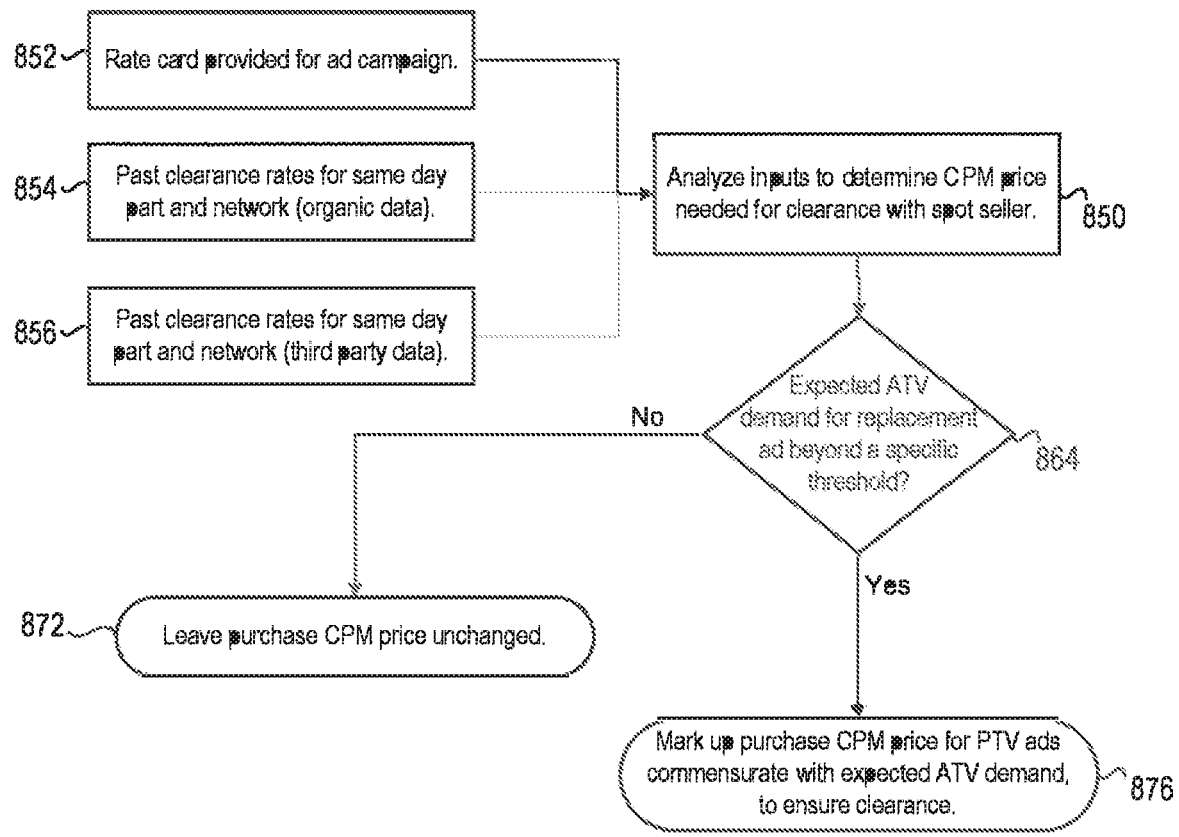
FIG. 8B is a flowchart of a method of yield optimization to automatically adjust a purchase CPM price to get clearance for a PTV ad campaign from a spot seller, according to one embodiment of the present disclosure.

FIG. 8B is a flow chart of a method of yield optimization to automatically adjust a purchase CPM price to get clearance for a PTV ad campaign from a spot seller according to one embodiment of the present disclosure. The PTV system can also be capable of using a number of inputs to determine what the appropriate CPM price should be to get clearance from the spot seller. To get clearance in a timely manner from the spot seller, and avoid the risk of being outbid by throttling the number of ad spots put through the PTV and ATV systems, these inputs can be closely monitored to get a high clearance percentage.

More particularly, and with reference to FIG. 8B, the PTV system can analyze campaign inputs to determine a purchase CPM price needed for clearance with a spot seller (850). The inputs can include, but not be limited to: the rate card provided (852); past clearance rates for the same day part/network (from the system's historic data) (854); and evaluating the past clearance rates for the same day part/network (from third parties) (856). After taking these inputs into consideration, the PTV system can choose to mark up the purchase CPM price by a percentage according to the ATV demand and opportunity for such spots. For example, the PTV system can determine, from the analysis in block 850, whether an expected ATV demand for replacement ads for the ad spot is beyond a specific threshold (864). If the answer is no to block 864, the PTV system can leave the purchase CPM price unchanged (872). If the answer is yes to block 864, the PTV system can mark up the purchase CPM price for broadcast ads commensurate with an expected increased ATV demand, to ensure clearance of the ad campaign with the spot seller (876). This can ensure that, except for unprecedented situations, clearance is given according to the gains available through either or a combination of increased purchase CPM price and ATV replacement ad demands.

Figure 9:
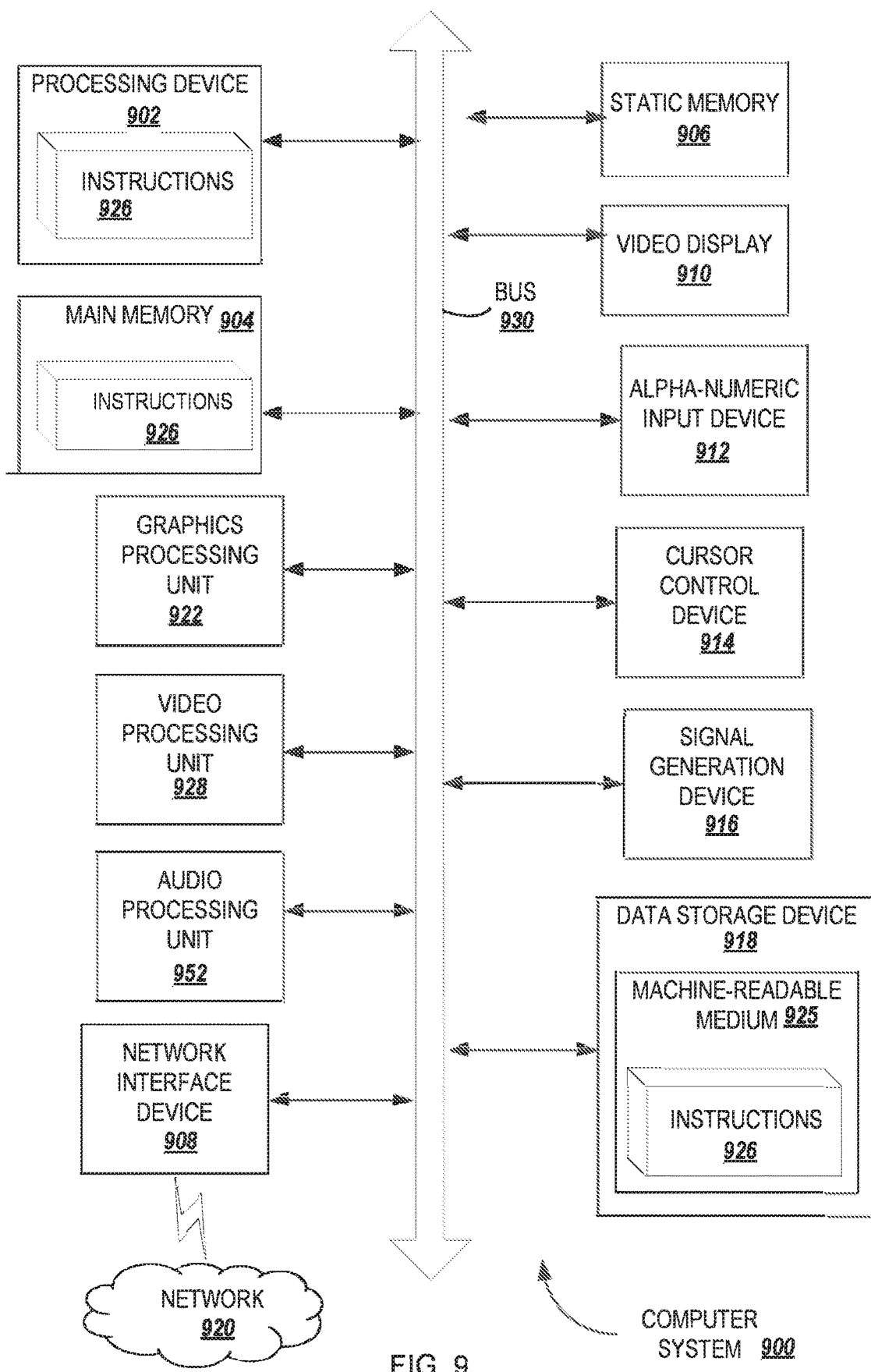
FIG. 9 illustrates a diagrammatic representation of a machine in the example form of a computer system within which a set of instructions, for causing the machine to perform any one or more of the methodologies discussed herein, can be executed.

FIG. 9 illustrates a diagrammatic representation of a machine in the example form of a computer system 900 within which a set of instructions, for causing the machine to perform any one or more of the methodologies discussed herein, can be executed. The computer system 900 can correspond to the systems described above with respect to FIGS. 1-8B (e.g., the DAR manager 102, the PTV system 110 or 310, the data storage system 112 or 312, the ATV system 118 or 318, the SSP computing system 16, the video DSP computing system 108, 116 or 308, and computing and/or communications systems for the broadcaster 104, the first brand owner 106, the second brand owner 114, and the smart TV 120, and any other system or platform disclosed herein), and that can execute the method disclosed herein.

In alternative embodiments, the machine can be connected (e.g., networked) to other machines in a LAN, an intranet, an extranet, or the Internet. The machine can operate in the capacity of a server or a client device in a client-server network environment, or as a peer machine in a peer-to-peer (or distributed) network environment. The machine can be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In one embodiment, processing device 902 can include one or more processing cores. The processing device 902 can execute the instructions 926 of a mirroring logic for performing the operations discussed herein.

The computer system 900 can further include a network interface device 908 communicably coupled to a network 920. The computer system 900 also can include a video display unit 910 (e.g., a liquid crystal display (LCD) or a cathode ray tube (CRT)), an alphanumeric input device 912 (e.g., a keyboard), a cursor control device 914 (e.g., a mouse), a signal generation device 916 (e.g., a speaker), or other peripheral devices. Furthermore, computer system 900 can include a graphics processing unit 922, a video processing unit 928, and an audio processing unit 932. In another embodiment, the computer system 900 can include a chipset (not illustrated), which refers to a group of integrated circuits, or chips, that are designed to work with the processing device 902 and controls communications between the processing device 902 and external devices. For example, the chipset can be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 can include a computer-readable storage medium 925 on which is stored instructions 926 embodying any one or more of the methodologies of functions described herein. The instructions 926 can also reside, completely or at least partially, within the main memory 904 and/or within the processing device 902 during execution thereof by the computer system 900; the main memory 904 and the processing device 902 also constituting computer-readable storage media.

The computer-readable storage medium 925 can also be used to store instructions 926 utilizing logic and/or a software library containing methods that call the above applications. While the computer-readable storage medium 925 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 926 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to secure memory repartitioning in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers. And can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

A number of implementations have been described. Nevertheless, it will be understood that various modifications may be made without departing from the spirit and scope of the disclosure. Accordingly, other implementations are within the scope of the following claims.

What is claimed is:

1. A system comprising:
a processing device; and
memory hardware in communication with the processing device, the memory hardware storing instructions that when executed on the processing device cause the processing device to perform operations comprising:
receiving, at an addressable television (ATV) system from a smart television (TV), an ad request for a replacement ad to be delivered to an ad spot to replace a programmatic television (PTV) ad;
determining, by the ATV, whether the PTV ad is on target for the ad spot;
when PTV ad is on target, determining whether the PTV ad is underperforming, overperforming, or on track based on a target performance for an ad campaign corresponding to the PTV ad;
when the PTV ad is underperforming,
adjusting, by the ATV system, a cost per mille (CPM) price of ATV impressions for the ad spot by a percentage at which the PTV ad is underperforming; and
requesting, by the ATV system, the replacement ad from a demand side platform (DSP); and
delivering, to the smart TV, the requested replacement ad.

2. The system of claim 1, wherein the target performance corresponds to metrics of an advertisement campaign, the metrics comprising a campaign budget, an impression cost, and a target audience.

3. The system of claim 1, wherein the operations further comprise, when the PTV ad is off target, fulfilling the ad request for the replacement ad by requesting the replacement ad from a demand side platform (DSP).

4. The system of claim 1, wherein:
determining whether the PTV ad is on target for the ad spot comprises querying a data storage system of a dynamic advertisement replacement (DAR) manager, the DAR manager in communication with, and providing ad inventory for, the smart TV; and
the data storage system comprises historical ad campaign data, viewer profiles, and viewing patterns corresponding to the viewer profiles, the data storage system configured to provide, based on advertising campaign objectives, at least one of a TV network, a day part, or a DAR impression prediction in response to the query.

5. The system of claim 1, wherein requesting, by the ATV system, the replacement ad from the DSP when the PTV ad is underperforming comprises:
determining that a demand for the replacement ad is at an increased CPM price; and
selling the replacement ad for the increased CPM price.

6. The system of claim 1, wherein the operations further comprise, when the PTV ad fails to be on target for the ad spot for the smart TV:
determining, by the ATV system, that the PTV ad is on target for the ad spot of a second smart TV that is underperforming; and
adjusting, by the ATV system, a minimum CPM price proportionally by an amount the PTV ad is underperforming at the second smart TV.

7. A method comprising:
receiving, at data processing hardware of an addressable television (ATV) system, an ad request from a smart television (TV) for a replacement ad to be delivered to an ad spot to replace a programmatic television (PTV) ad;

determining, by the data processing hardware, whether the PTV ad is on target for the ad spot;

when PTV ad is on target, determining, by the data processing hardware, whether the PTV ad is underperforming, overperforming, or on track based on a target performance for an ad campaign corresponding to the PTV ad;

when the PTV ad is underperforming,
- adjusting, by the data processing hardware, a cost per mule (CPM) price of ATV impressions for the ad spot by a percentage at which the PTV ad is underperforming; and
- requesting, by the data processing hardware, the replacement ad from a demand side platform (DSP); and delivering, by the data processing hardware, the requested replacement ad to the smart TV.

8. The method of claim 7, wherein the target performance corresponds to metrics of an advertisement campaign, the metrics comprising a campaign budget, an impression cost, and a target audience.

9. The method of claim 7, further comprising, when the PTV ad is off target, fulfilling, by the data processing hardware, the ad request for the replacement ad by requesting the replacement ad from the DSP.

10. The method of claim 7, wherein:
determining whether the PTV ad is on target for the ad spot comprises querying a data storage system of a dynamic advertisement replacement (DAR) manager, the DAR manager in communication with, and providing ad inventory for, the smart TV; and the data storage system comprising historical ad campaign data, viewer profiles, and viewing patterns corresponding to the viewer profiles, the data storage system configured to provide, based on advertising campaign objectives, at least one of a TV network, a day part, or a DAR impression prediction in response to the query.

11. The method of claim 7, wherein requesting the replacement ad from the DSP comprises:
determining that a demand for the replacement ad is at an increased CPM price; and
selling the replacement ad for the increased CPM price.

12. The method of claim 7, further comprising, when the PTV ad fails to be on target for the ad spot for the smart TV:
determining, by data processing hardware of the ATV system, that the PTV ad is on target for the ad spot of a second smart TV that is underperforming; and
adjusting, by data processing hardware of the ATV system, a minimum CPM price proportionally by an amount the PTV ad is underperforming at the second smart TV.

* * * * *